US007167255B1

(12) United States Patent
Mikami et al.

(10) Patent No.: US 7,167,255 B1
(45) Date of Patent: Jan. 23, 2007

(54) METHOD FOR DISPLAYING DESIRED MESSAGE IN DISPLAY UNIT OF DATA PROCESSING APPARATUS FOR VARIOUS PROCESSES

(75) Inventors: Kenji Mikami, Kawasaki (JP); Takeshi Ohya, Tokyo (JP); Masaki Unishi, Tokyo (JP); Hiroshi Sumio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/451,442

(22) Filed: Nov. 30, 1999

(30) Foreign Application Priority Data

Jul. 31, 1998 (JP) ................................ 10-230088
Nov. 9, 1999 (JP) ................................ 11-318173

(51) Int. Cl.
*G06F 15/00* (2006.01)
*G06F 9/00* (2006.01)
*G03G 15/00* (2006.01)

(52) U.S. Cl. .................... 358/1.15; 358/1.14; 358/437; 715/808; 399/81

(58) Field of Classification Search ............... 358/1.15, 358/1.19, 1.14, 437; 709/228; 345/751; 399/74, 80, 81; 355/202; 715/808
See application file for complete search history.

(56) References Cited

U.S. PATENT DOCUMENTS 5,206,687 A * 4/1993 Suzuki et al. ................. 399/74
5,339,134 A * 8/1994 Nakamura et al. .......... 399/367
5,513,126 A * 4/1996 Harkins et al. ............. 709/228
5,822,123 A * 10/1998 Davis et al. .................. 725/43
5,828,372 A * 10/1998 Kameda ..................... 345/751
5,892,509 A * 4/1999 Jakobs et al. ............... 345/751
6,034,652 A * 3/2000 Freiberger et al. .......... 715/730
6,185,603 B1 * 2/2001 Henderson et al. ......... 709/206
6,219,708 B1 * 4/2001 Martenson .................. 709/226
6,295,389 B1 9/2001 Inui et al. .................... 382/312
6,304,277 B1 * 10/2001 Hoekstra et al. ............ 345/600
6,356,893 B1 * 3/2002 Itakura et al. ................. 707/3
6,426,800 B1 * 7/2002 Mizuno et al. ............ 358/1.15
6,433,880 B1 8/2002 Nishikata et al. .......... 358/1.13

FOREIGN PATENT DOCUMENTS

JP 06-164811 A 6/1994
JP 070131575 A 5/1995
JP 09-134297 A 5/1997
JP 09-326822 A 12/1997
JP 10-190896 A 7/1998
JP 11-046278 A 2/1999
JP 11-212406 A 8/1999
JP 11-298519 A 10/1999

OTHER PUBLICATIONS

U.S. Appl. No. 08/600,050, filed Feb. 12, 1996.
U.S. Appl. No. 08/844,370, filed Apr. 18, 1997.

* cited by examiner

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

A data processing apparatus comprises process means for executing a predetermined process based on the input instruction, connection means for connection with an external device, display means for displaying information based on the data received from the external device through the connection means, discrimination means for discriminating whether the input by the instruction input means has not been executed for a predetermined period. Control means causes the display means to execute display based on the data received from the external device through the connection means, in case the discrimination means judges that the input instruction has not been executed for the predetermined period.

11 Claims, 24 Drawing Sheets

FIG. 20

From : "Takeshi OYA" <oya@shimomaruko.canon.co.jp>
To : Printer1@shimomaruko.canon.co.jp
Subject : Set
Date : Fri, 4 Jun 1999 11:01:08 +0900
X-Priority : 3
Received : from mail1.canon.co.jp with ESMTP id LAA29178 ; Fri, 4 Jun 1999 11:00:35 +0900 (JST)
Message-ID : <0D111989A00A0C9AAA9282A250D@shimomaruko.canon.co.jp>
MIME-Version : 1.0
X-Mailer : Internet Mail Service (5.5.2448.0)
Content-Type : text/plain ; charset='iso-2022-jp'
X-UIDL : DU> ejox0 !!+5e9je !!

TYPE = 3
LINE1 = "NEXT MAINTENANCE SCHEDULE"
LINE2 = "10:00-12:00, JUN 22"
LINE3 = "COPY IS NOT AVAILABLE IN THIS TERM"
LINE4 = "SORRY"
PANEL = "COPY"
STATUS = "PUSH RESET KEY AFTER USED"

FIG. 21

To : "Takeshi OYA" <oya@shimomaruko.canon.co.jp>
Subject : Reply to your request.

Urgent Mode (COPY SCREEN)
"NEXT MAINTENANCE SCHEDULE"
"10:00-12:00, JUN 22"
"COPY IS NOT AVAILABLE IN THIS TERM"
"SORRY"
STATUS MESSAGE = "PUSH RESET KEY AFTER USED"

| PRIORITY | DISPLAY COLOR |
|---|---|
| 1 | RED |
| 2 | PINK |
| 3 | BLUE |

| FILE ATTRIBUTE | SCREEN COLOR |
|---|---|
| ORDINARY FILE | BLUE |
| FILE PROTECTED BY PASSWORD | RED |

METHOD FOR DISPLAYING DESIRED MESSAGE IN DISPLAY UNIT OF DATA PROCESSING APPARATUS FOR VARIOUS PROCESSES

BACKGROUND OF THE INVENTION

1. Field of the Invention

The present invention relates to a data processing apparatus connected to an external apparatus, and adapted to execute various processes and to display various information, a control method therefor, and a computer readable memory medium storing a program for controlling such apparatus.

2. Related Background Art

There is conventionally known a multiple-function apparatus having multiple functions such as copying, facsimile communication and printing.

Such multi-function apparatus is provided with an operation unit which is utilized for entering various operations by the operator or displaying various information, in order to utilize various functions. Conventionally such operation unit is used only for displaying the information for guiding the operations or the information indicating the status of the apparatus.

However, for giving a notice on such multiple-function apparatus, such as limiting the use of certain ones among the multiple functions, there is required a cumbersome procedure such as writing the content of notice on a piece of paper and pasting such paper on the multi-function apparatus.

SUMMARY OF THE INVENTION

An object of the present invention is to provide a data processing apparatus not associated with the aforementioned drawbacks.

Another object of the present invention is to provide a data processing apparatus capable of giving desired information to the operator executing input of operations for the data processing apparatus.

Still another object of the present invention is to provide a data processing apparatus capable of easily informing the desired information, without hindering the operation of the operator.

Still another object of the present invention is to provide a data processing apparatus enabling easy confirmation and correction of the informed information.

Still another object of the present invention is to provide a data processing apparatus enabling easy limitation of the processing.

Still another object of the present invention is to provide a data processing apparatus capable of selecting the informing method matching the objective.

The above-mentioned and still other objects of the present invention will become fully apparent from the following detailed description which is to be taken in conjunction with the attached drawings.

BRIEF DESCRIPTION OF THE DRAWINGS

FIG. 20 is a view showing a display message setting mail prepared in the PC/WS 11-1;

FIG. 21 is a view showing a response mail for informing the display message information currently set in the composite apparatus;

DESCRIPTION OF THE PREFERRED EMBODIMENTS

The present invention will be clarified in detail by embodiments thereof with reference to the attached drawings.

Fist Embodiment

Figure 1:
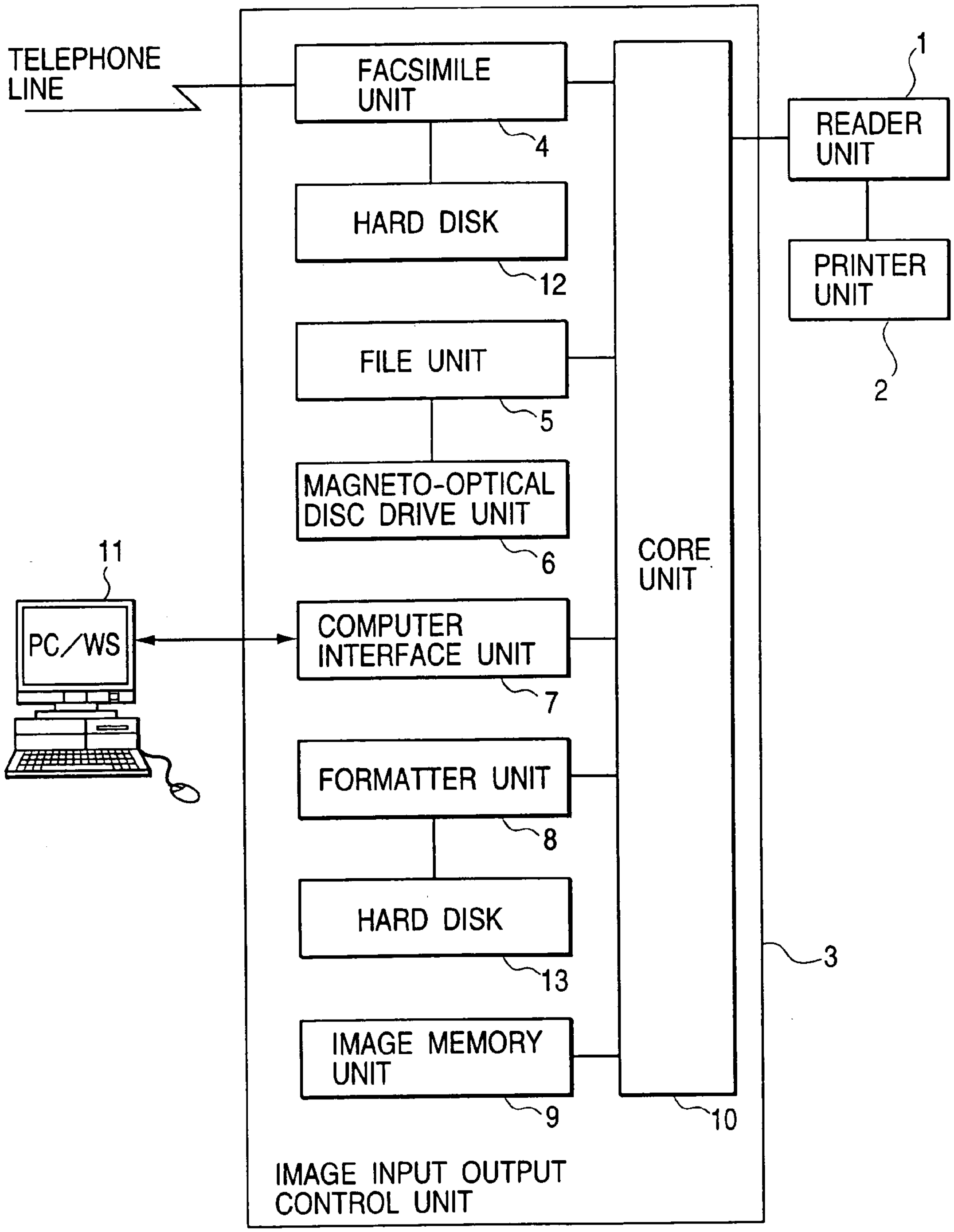
FIG. 1 is a schematic block-diagram showing the configuration of a composite apparatus embodying the present invention.

FIG. 1 is a schematic block diagram showing the configuration of a composite apparatus embodying the present invention. A reader unit 1 is connected to an image input/output control unit 3, reads the image of an original 5 and outputs image data corresponding to the original image to a printer unit 2 and an image input/output control unit 3. The printer unit 2 records, on a recording sheet, an image corresponding to the image data from the reader unit 1 and the image input/output control unit 3. The image input/output control unit 3 is provided with a facsimile unit 4, a file unit 5, a magnetooptical disk drive unit 6, a computer interface unit 7, a formatter unit 8, an image memory unit 9, a core unit 10, and hard disks 12, 13. In the present embodiment, these units of various functions are constructed as a single composite apparatus, which will hereinafter be called a composite apparatus.

The facsimile unit 4 expands compressed image data, received by facsimile reception through a telephone line, transfers the expanded image data to the core unit 10, also compresses the image data transferred from the core unit 10 and transmits the compressed image data by facsimile transmission through the telephone line. The hard disk 12 is connected to the facsimile unit 4 and can temporarily store the received compressed image data.

The file unit 5 is connected to the magnetooptical disk drive unit 6. The file unit 5 compresses the image data transferred from the core unit 10 and stores the compressed image data together with a keyword for searching in a magnetooptical disk set in the magnetooptical disk drive unit 6. Based on the keyword transferred through the core unit 10, the file unit 5 searches the compressed image data stored in the magnetooptical disk, reads and expands the searched compressed image data and transfers the expanded image data to the core unit 10.

The computer interface unit 7 is an interface between a personal computer or a work station (hereinafter represented as PC/WS and called computer) 11 and the core unit 10. The computer interface unit 7 is connected to the PC/WS either directly or through a LAN. The formatter unit 8 develops code data, such as PDL, representing the image transferred from the computer 11, into image data of a format recordable by the printer unit 2. The formatter unit 8 is provided with the hard disk 13 for temporarily storing the code data, representing the image transferred from the computer 11, or rasterized image data.

The image memory unit 9 stores the data transferred from the computer 11, and can store plural files. The core unit 10 controls the data flow among the reader unit 1, facsimile unit 4, file unit 5, computer interface unit 7, formatter unit 8 and image memory unit 9, as will be explained later in more details.

Figure 2:
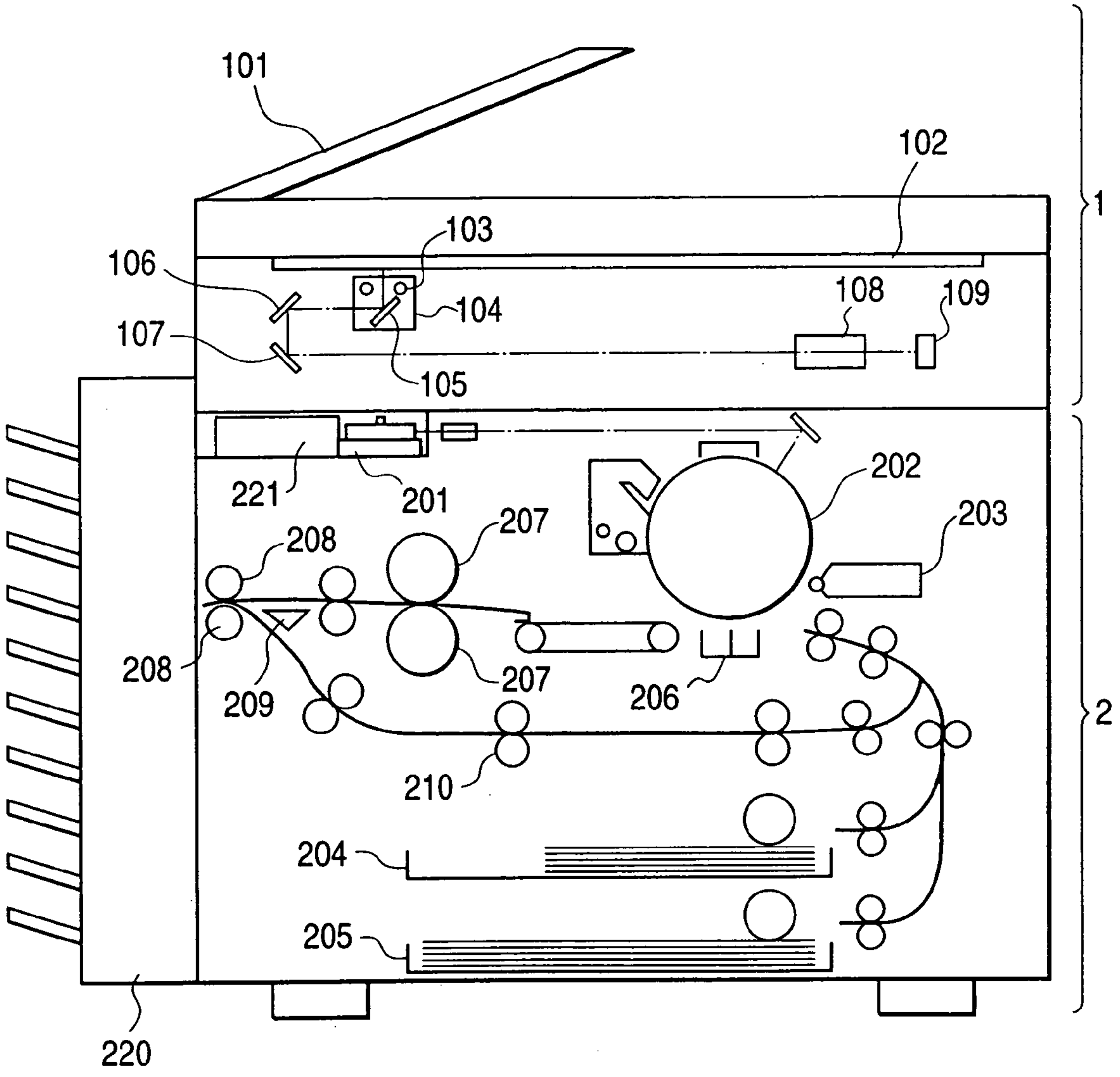
FIG. 2 is a cross-sectional view of a reader unit 1 and a printer unit 2 of the composite apparatus shown in FIG. 1.

FIG. 2 is a cross-sectional view of the reader unit 1 and the printer unit 2. An original feeding device 101 of the reader unit 1 feeds the originals, set with the image bearing face upward, one by one from the last page onto a platen glass 102 and, after the reading of the image on the original, discharges the original from the platen glass 102. When the original is conveyed onto the platen glass 102, it is scanned by turning on a lamp 103 and moving a scanner unit 104.

The light reflected from the original is guided, through mirrors 105, 106, 107 and a lens 108 to a CCD image sensor (hereinafter called CCD) 109. The image bearing light from the scanned original enters the CCD 109, photoelectrically converted and outputted as image data. The image data from the CCD 109 are subjected to predetermined processing and transferred to the printer unit 2 and the core unit 10 of the image input/output control unit 3.

A laser driver 221 of the printer unit 2 drives a laser light emission unit 201 and causes the laser light emission unit 201 to emit a laser beam according to the image data outputted from the reader unit 1 or the core unit 10. The laser beam irradiates a photosensitive drum 202, thereby forming a latent image corresponding to the laser beam. Developer is deposited by a developing unit 203 on the latent image portion on the photosensitive drum 202. Synchronized with the start of irradiation with the laser beam, a recording sheet is fed from a cassette 204 or 205 to a transfer unit 206, and the developer deposited onto the photosensitive drum 202 is transferred onto the recording sheet.

The recording sheet, bearing the transferred developer, is conveyed to a fixing unit 207, wherein the developer is fixed to the recording sheet by heat and pressure. The recording sheet, passing through the fixing unit 207, is discharged by discharge rollers 208, and a sorter 220 sorts the discharged recording sheets into respective bins. If the sorting is not selected, the sorter 220 stores the recording sheets in an uppermost bin.

If two-side recording is selected, the recording sheet is conveyed to the position of the discharge rollers 208, and then the rotation of the discharge rollers 208 is reversed and the recording sheet is guided by a flapper 209 in an inverted state to a sheet re-feeding path feeding via rollers such as rollers 210. Also if multiple recording is selected, the recording sheet is not guided to the discharge rollers 208 but guided by the flapper 209 to the sheet re-feeding patch in an uninvited state. The recording sheet guided to the sheet re-feeding path is fed to the transfer unit 206 at the aforementioned timing.

Figure 3:
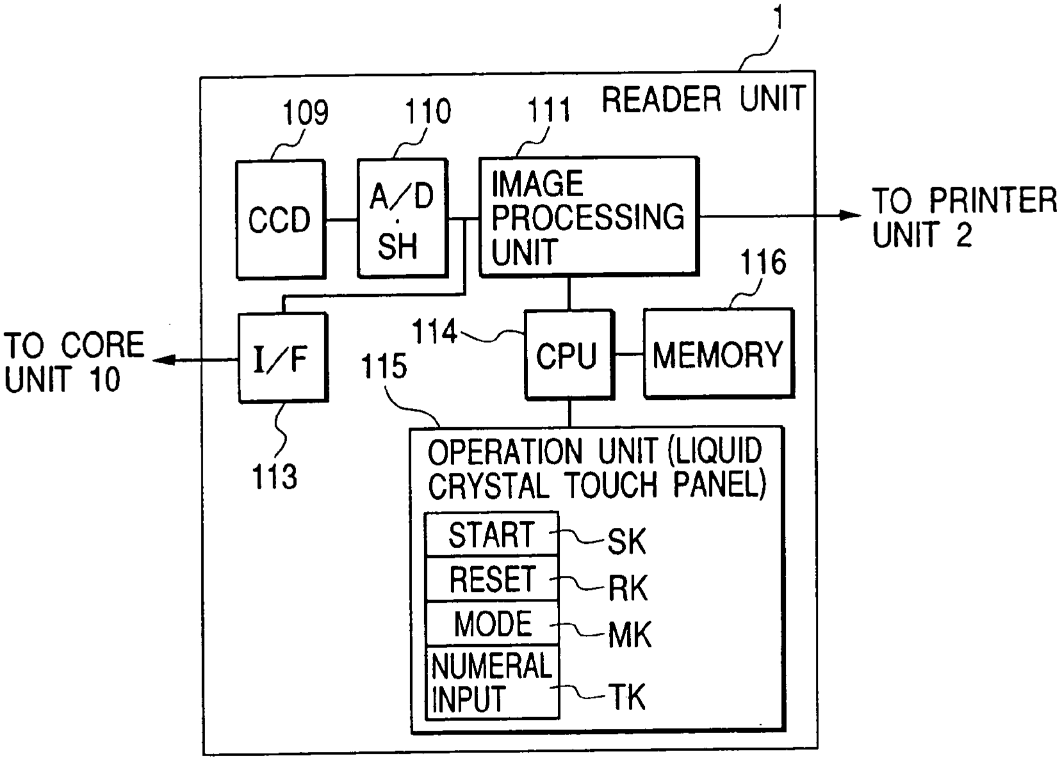
FIG. 3 is a schematic block diagram showing the configuration of the reader unit 1.

FIG. 3 is a block diagram of the reader unit 1. Image data outputted from the CCD 109 are subjected to A/D conversion and shading correction in an A/D-SH unit 110. Thus processed image data are transferred through an image processing unit 111 to the printer unit 2 and also transferred through an interface unit 113 to the core unit 10 of the image input/output control unit 3.

The CPU 114 controls the image processing unit 111 and the interface 113 according to the content set by an operation unit 115. For example, if the operation unit 115 sets a copy mode for copying with image trimming, the image data are transferred to the printer unit 2 after a trimming process in the image processing unit 111. Also if the operation unit 115 sets a facsimile transmission mode, the image data and a control command corresponding to the set mode are transferred from the interface 113 to the core unit 10. The program for such control of the CPU 114 is stored in a memory 116 and the CPU 114 executes control while referring to the memory 116. The memory 116 is also used as a work area for the CPU 114.

The operation unit 115 is provided with a liquid crystal touch panel TP, which is used for input operations and for display function. The operation unit 115 is also provided with hardware keys such as a start key SK for starting various processes, a reset key RK for returning the current process or mode to an initial state, a mode setting key MK for setting for example a copy mode (for printing the image, based on the image data from the reader unit 1, in the printer unit 2), a facsimile mode (for processing by the facsimile unit 4), a printer mode (for printing the image, based on the image data from the core unit 10, in the printer unit 2) etc., and ten keys TK for entering the number of prints etc. The display image area of the operation unit 115 displays not only guidance displays for various operations but also various message data transmitted from a computer 11 of the manager. The display image area of the operation unit 115 also displays various contents corresponding to the function in execution or the designated function (copying function, facsimile function, printer function etc.).

Figure 4:
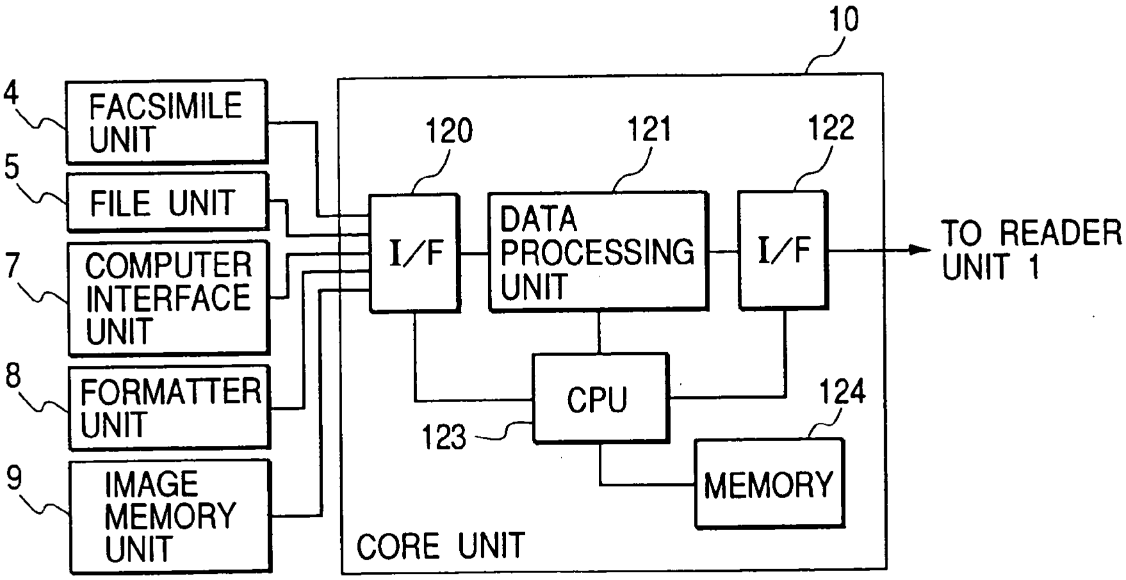
FIG. 4 is a schematic block diagram showing the configuration of a core unit 10.

FIG. 4 is a block diagram of the core unit 10. The image data from the reader unit 1 are transferred to a data processing unit 121, and the control command from the reader unit 1 is transferred to a CPU 123, via interface 122. The data processing unit 121 executes various image processings such as image rotation or change of image magnification, and the image data transferred from the reader unit 1 to the data processing unit 121 are transferred through the interface 120, according to the control command transferred from the reader unit 1, to the facsimile unit 4, file unit 5 or computer interface unit 7.

Code data such as PDL, representing the image entered through the computer interface unit 7, are transferred to the data processing unit 121 and then to the formatter unit 8 and developed into rasterized image data, which are then transferred through the data processing unit 121 to the facsimile unit 4 or the printer unit 2. Such image data are transferred to the data processing unit 121 and then to the facsimile unit 4 or the printer unit 2. The image data from the facsimile unit 4 are transferred to the data processing unit 121 and then to the printer unit 2, the file unit 5 or the computer interface unit 7. Also the image data from the file unit 5 are transferred to the data processing unit 121 and then to the printer unit 2, the facsimile unit 4 or the computer interface unit 7.

The CPU 123 controls the above-described operations according to the control program stored in a memory 124 and the control command transferred from the reader unit 1. The memory 124 is used also as a work area for the CPU 123.

It is thus possible, using the core unit 10 as a core of the operations, to execute various functions such as reading of the original image, image printing, image transmission/reception, image storage, data input/output with the computer etc. in a composite manner.

When the code data such as PDL representing the image transferred from the computer 11 are received through the computer interface unit 7, the formatter unit 8 informs the core unit 10 of the start of a job. Upon receiving the receiving the response for the start of job from the core unit 10, the formatter unit 8 develops the code data into bit map image data that can be recorded by the printer unit 2, and temporarily stores such image data in the hard disk 13. In this operation, the output operation setting information such as the sheet feeding cassette, number of output images and one/both-side printing is also temporarily stored in the hard disk 13. Thereafter the image data and the output operation setting information are transferred through a bus to the printer unit 2 and are printed therein. The printing of plural copies, for example three-copy printing of pages 1 to 3, is executed by repeating the printing of pages 1 to 3 three times.

Figure 5:
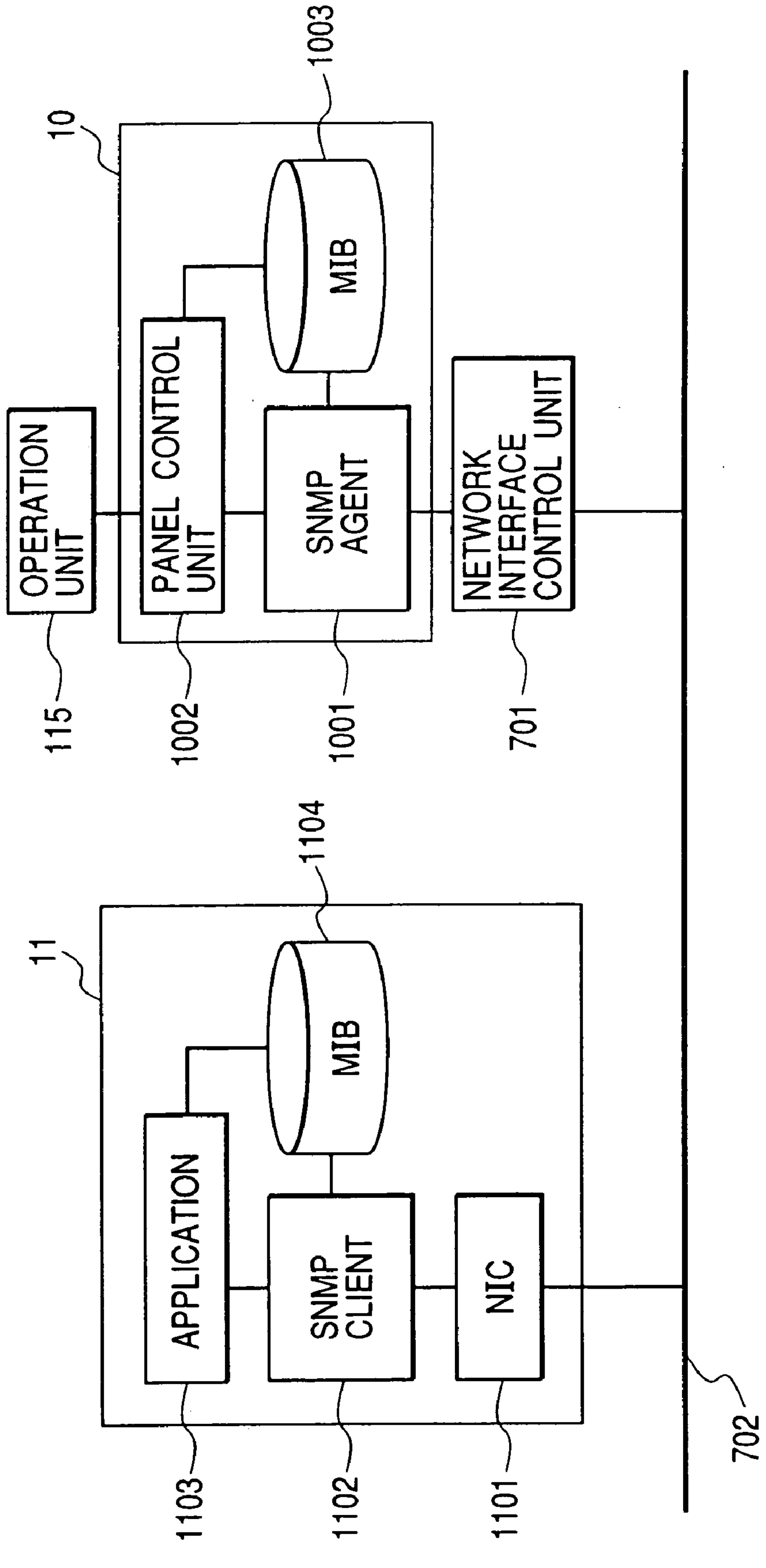
FIG. 5 is a block diagram showing functioning modules in a system including the composite apparatus shown in FIG. 1 and a PC/WS 11 connected through a network.

FIG. 5 shows the configuration of modules required for realizing the present embodiment.

In the following there will be explained a case where the composite apparatus of the present embodiment is connected to a LAN (local area network) 702 through the computer interface unit 7.

The PC/WS 11 connected to the computer interface unit 7 and the LAN 702 is provided with a CPU, a ROM, a RAM, a hard disk, a display and a keyboard. There is also mounted a network interface card (NIC) 1101 for controlling the data exchange through the LAN 702, and a control program therefor is assumed to be installed in the hard disk. It is assumed that, in the hard disk, there are at least installed an SNMP client module 1102 for executing information exchange as a manager with an agent according to SNMP (simple network management protocol), an application software 1103 for controlling the message information to be employed in the present embodiment, and a program for constructing and controlling an MIB management unit 1104 for managing the message information based on MIB (management information base).

A network interface control unit 701 is contained in the computer interface unit 7 and controls the data exchange with other apparatus through the LAN 702.

The memory 124 of the core unit 10 is assumed to store program information for controlling an SNMP agent module 1001 for executing information exchange by SNMP, a panel control unit 1002 for controlling the content of display etc. on the operation unit 115, and an MIB management unit 1003 for managing the message information etc. by MIB. The message data to be managed by the MIB management unit 1003 are stored in the hard disk 13.

Figure 6:
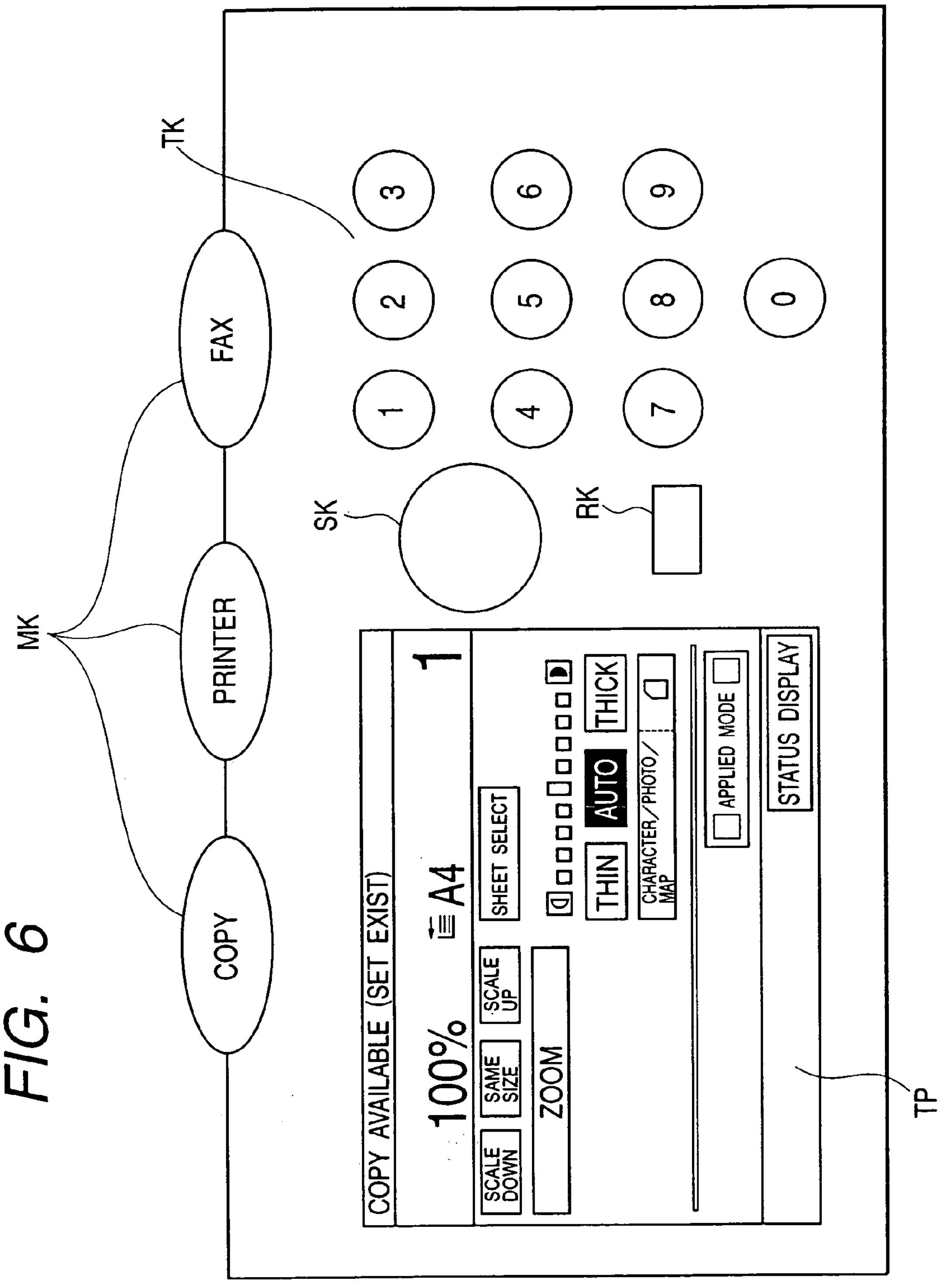
FIG. 6 is a schematic view of an operation unit 115.

FIG. 6 is a schematic view of the operation unit 115.

The mode setting keys MK for respectively setting the copy mode, printer mode and facsimile mode, the ten keys TK for entering numerals in various settings, the start key SK for starting various operations and the reset key RK for canceling the setting or for instructing the shift to the initial state are constructed with hardware keys, and the liquid crystal touch panel TP for displaying various information and for entering instructions changes the content of display and the functions under the control of a software.

Figure 7:
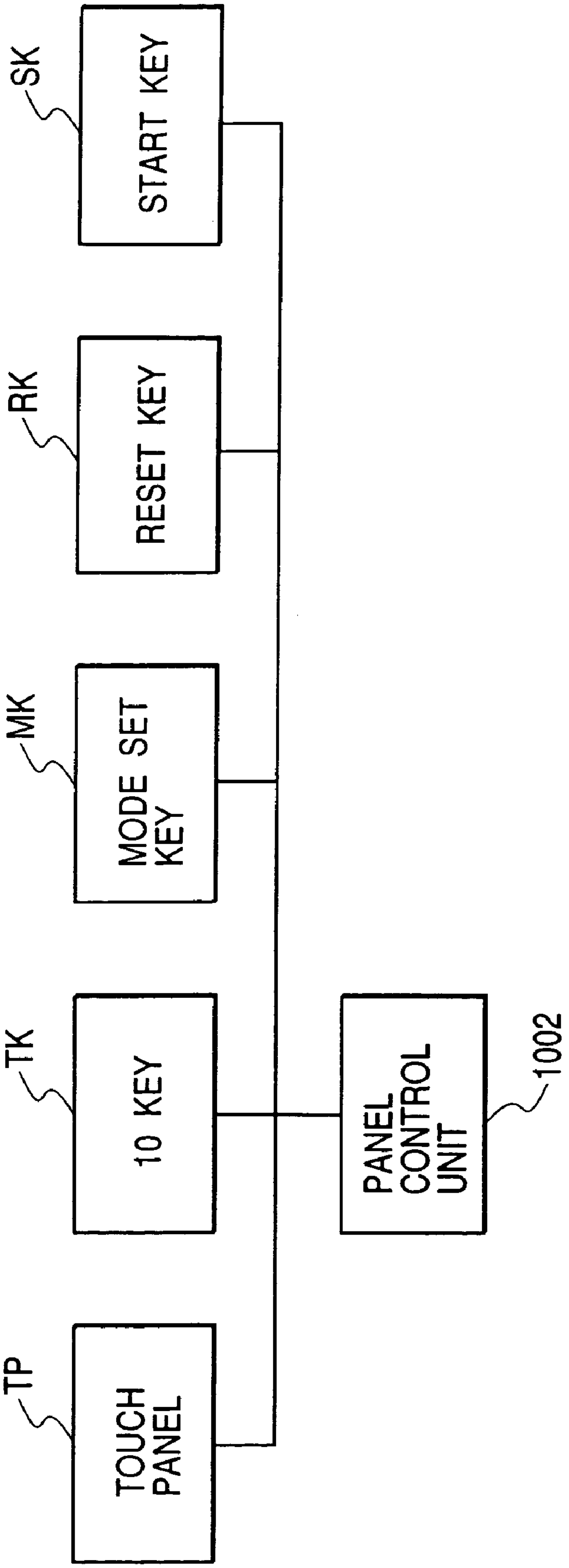
FIG. 7 is a schematic block diagram showing the configuration of the operation unit 115 and the configuration for the control thereof.

FIG. 7 is a block diagram showing the configuration for executing processes relating to the operation unit 115.

The operation unit 115 is controlled by a panel control unit 1002, which detects various conditions to control the permission or inhibition of each key input and to indicate the operation by the operator on the displayed content of the touch panel TP.

The panel control unit 1002 constantly monitors, at a predetermined cycle time, the operation state of various units of the composite apparatus, the entered message information and the key inputs of the operation unit 115, thereby controlling the operation unit 115 and transmitting the content of operation of the operation unit 115 to the units of the composite apparatus shown in FIG. 1.

Figure 8:
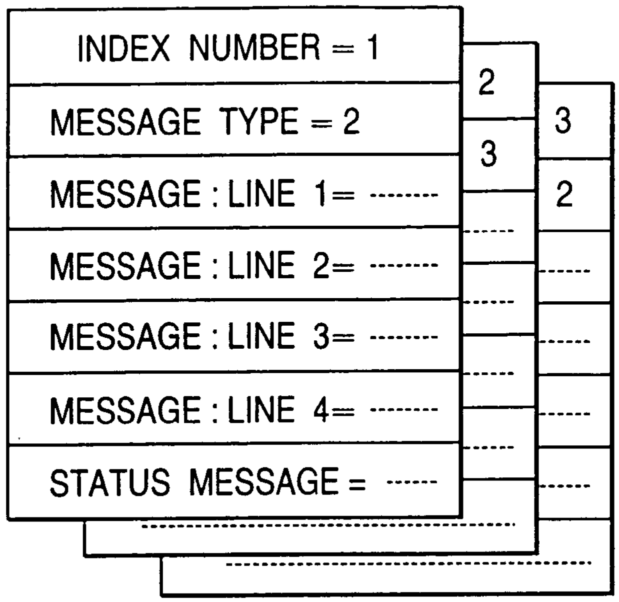
FIG. 8 is a view showing message information managed by an MIB management units 1104 and 1003.

FIG. 8 shows the message information managed by the MIB management units 1104, 1003. The message information is managed under an object defining the MIB message table for display on the operation unit 115. The name indicating such object is represented by an array of node numbers from the root to the message table in the MIB tree.

In the present embodiment, there can be managed plural message patterns for display in a message display area of the touch panel TP of the operation unit 115, and the message type designating information M and the message content are managed in correlation with an index number N. The message is either a pop-up message or a status message, as will be explained later, and these information constitute a group. The structure of these information is defined by description with the ASN.1 language.

The index number N is defined as N=1 for the image for copy mode; N=2 for the image for printer mode; and N=3 for the image for facsimile mode. In this case, a number is assigned for each mode, but it is also possible to assign other numbers for plural messages and to utilize such messages by suitably reading these numbers.

The pop-up message can contain 4 rows, with 64 characters at maximum per row.

The message type indicates the display mode of the above-mentioned 4-row pop-up message, and includes a non-display (delete) mode M=1; a normal display mode M=2; and an urgent mode M=3. The details of these modes will be explained later.

In addition to the pop-up message, there can be set, for each mode, a status message of a row up to 64 characters.

The PC/WS 11 can manage the display messages for plural composite apparatus of a same kind, and, in each composite apparatus, plural message information can be managed for each mode display in a hierarchic structure (each message information being arranged in the hierarchic layer under the object indicating the kind of the composite apparatus). To each composite apparatus, the corresponding message information is selected and transmitted.

Figure 9:
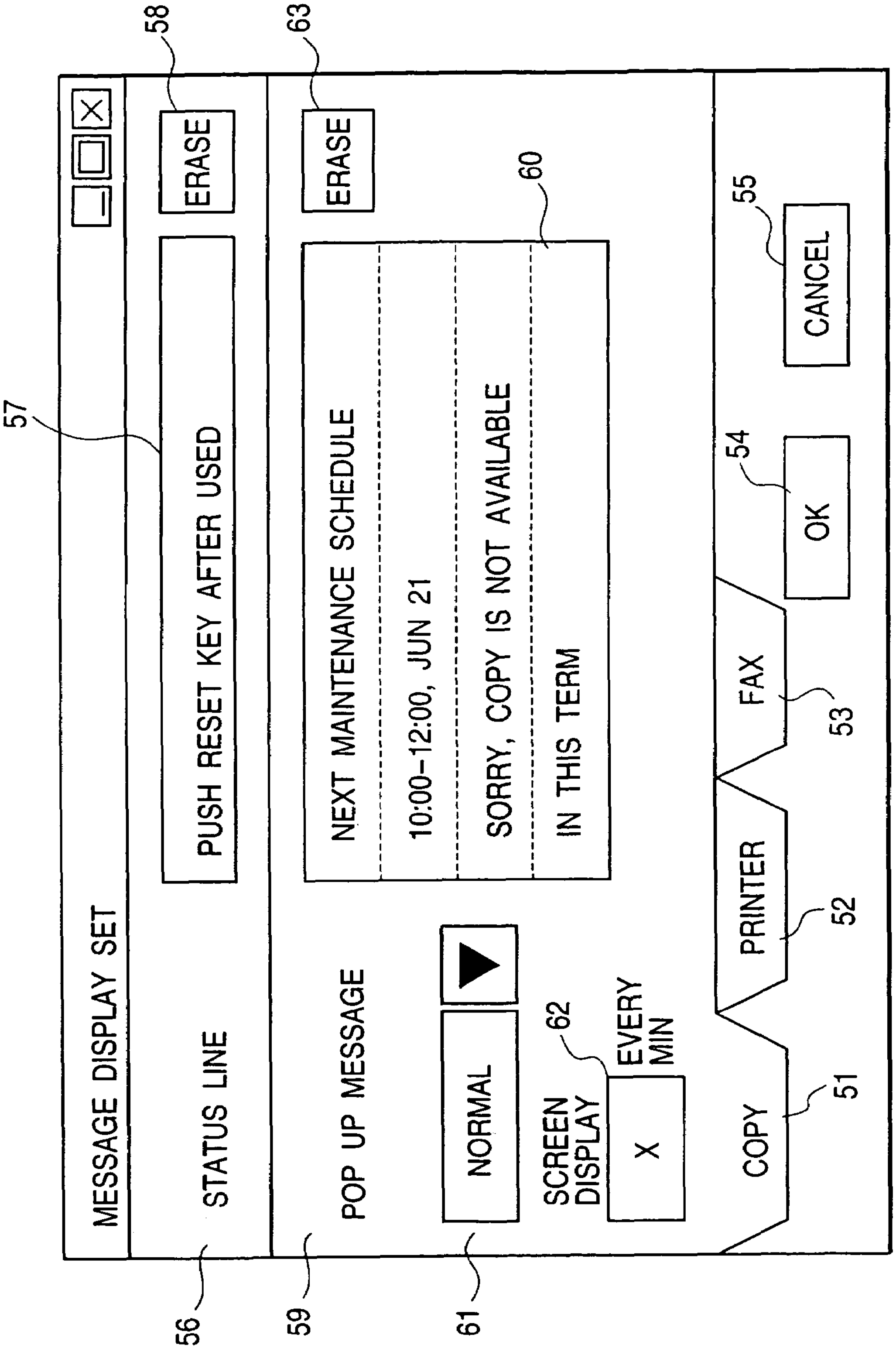
FIG. 9 is a utility display setting image frame for preparing message data in the PC/WS 11.

The message data transmitted from the PC/WS 11 to the composite apparatus shown in FIG. 1 can be prepared, as shown in FIG. 4, by the GUI (graphic user interface) method. More specifically, the message display frame shown in FIG. 9 is displayed, by a predetermined operation of the PC/WS 11, under the control of the application 1103. Such message display frame contains a copy key 51, a printer key 52 and a fax key 53 as the keys (or icons) for designating the mode (function) for which the message is displayed, and the designation is made by selecting and clicking a desired key with the mouse. FIG. 9 shows a state in which the copy key 51 is designated.

In FIG. 9, a status row area 56 is used for entering message data to be displayed, as the status message, in a part (a row) of the touch panel TP of the operation unit 115 of the image forming apparatus (composite apparatus), and message data of a row (up to 64 characters) such as "PUSH RESET KEY AFTER USE" are entered in an input area 57. In the status row area 56, there is also displayed an erase key 58, which is used for erasing the message data entered into the input area 57. When the object of the message is finished, its display is terminated by selecting the OK key 54 in a state in which the input area 57 is blank.

A pop-up message area 59 is used for entering message data to be displayed on the substantially entire area of the touch panel TP of the operation unit 115, and message data of 4 rows (up to 64 characters per row) as shown in FIG. 9 are entered in an input area 60.

A pull-down menu 61 is used for designating the display mode of the pop-up message and allows to select "delete (non-display mode", "normal (normal display) mode" or "urgent mode".

When the OK key 54 is depressed while "delete" is selected, corresponding information is transmitted through the NIC 110 to the composite apparatus shown in FIG. 1, and the panel control unit 1002 receiving such information executes control in such a manner that the pop-up message is not displayed on the touch panel TP of the operation unit 115.

When the OK key 54 is depressed while "normal" is selected, the character train entered in the input area 60 is transmitted to the composite apparatus and is displayed in the pop-up message display area of the touch panel TP of the control unit 115. The pop-up message displayed on the touch panel TP in the normal display mode can be arbitrarily erased by the user through an operation on the operation unit 115.

When the OK key 54 is depressed while "urgent" is selected, the character train entered in the input area 60 is transmitted to the composite apparatus and is displayed in the pop-up message display area of the touch panel TP of the control unit 115. The pop-up message displayed on the touch panel TP in the urgent display mode cannot be erased unless a particular operation is executed on the operation unit 115.

A display time designation area 62 is used for entering the interval of display in case the message data in the input area 60 are displayed on the display area of the operation unit 115 of the composite apparatus. For example if "1 minute" is entered in this area 62, the pop-up message is displayed again in case no operation is executed after the lapse of 1 minute from the erasure of the pop-up message.

An erase key 63 of the pop-up message area 59 functions same, for the message data in the input area 60, as the erase key 58 of the status row area 56. The OK key 54 is used for fixing the set content, and a cancel key 55 is used for canceling the set content.

The above-mentioned functions of the PC/WS 11 for setting and transmitting the message data are realized by installing, in a hard disk, an application program recorded in a floppy disk or a CD-ROM (not shown).

In the following there will be explained the message displaying process. At first there will be explained the message displaying process in the first embodiment of the present invention.

Figure 10:
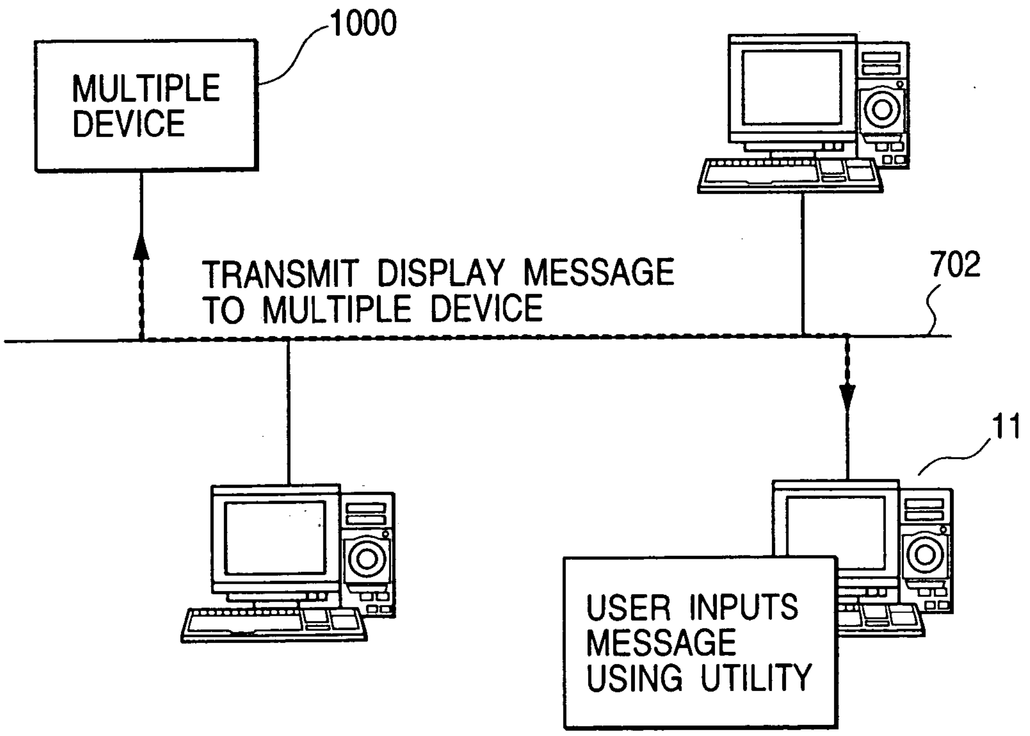
FIG. 10 is a view showing the data flow between the composite apparatus shown in FIG. 1 and the PC/WS 11 connected through the network.

FIG. 10 schematically shows the data flow in such process.

The PC/WS 11 displays a message preparing frame as shown in FIG. 9 by a utility based on the application 1103, and transmits message data, representing the entered display message, to the composite apparatus 1000 shown in FIG. 1 through the LAN 702.

The formatter unit 8 of the composite apparatus 1000 receives the message data, representing the display message, from the PC/WS 11 through the computer interface unit 7, and stores the received message data in the hard disk 13. The composite apparatus 1000 analyzes the received message data as will be explained later and displays the message on the operation unit 115.

Figure 11:
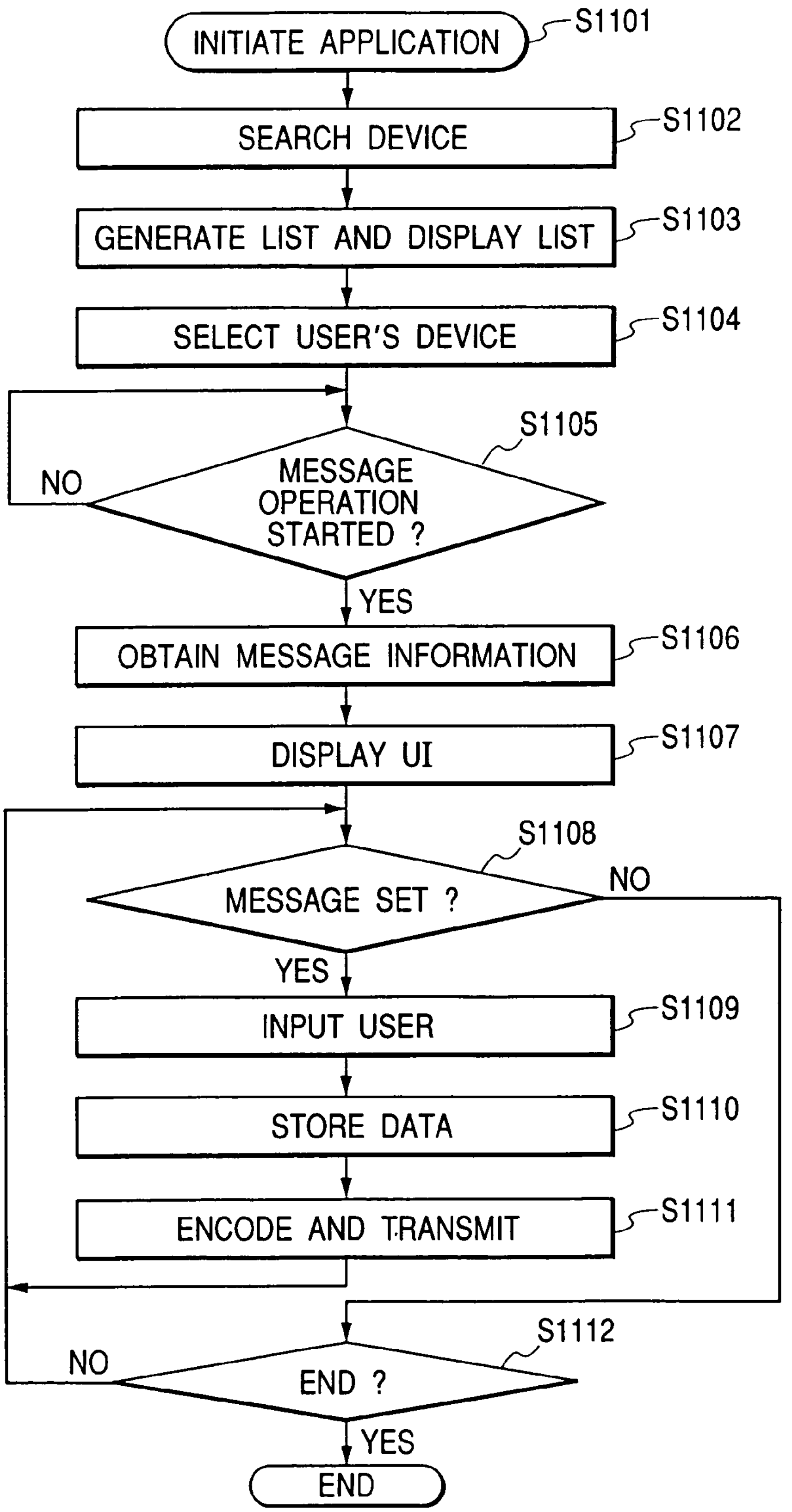
FIG. 11 is a flow chart showing the process sequence by the PC/WS 11.

FIG. 11 is a flow chart showing the process flow in case of entering and transmitting the display message by the PC/WS 11.

This flow chart is executed by the application 1103, in cooperation with the OD, SNMP client module 1102, MIP management unit 1104, NIC 1101 etc. installed in the PC/WS 11, and indicates the process sequence controlled by the CPU of the PC/WS 11 based on a controlling program installed in the hard disk of the PC/WS 11.

At first a step S1101 activates the application 1103 for utility for the display message, and a step S1102 searches the composite apparatus (and compatible apparatus thereof) connected to the LAN 702. The search may be executed by broadcasting, in the entire LAN 702, a command for acquiring the MIB data held by the composite apparatus by SNMP, or by an exclusive protocol for device search.

After the desired apparatus is searched, in a step S1103, the application 1103 displays, on the display of the PC/WS 11, icons of the searched composite apparatus and the compatible apparatus and also displays a message requesting the user to select one of the displayed apparatus.

When the desired apparatus is selected in a step S1104 and a step S1105 discriminates that the message operation has been started, the sequence proceeds to a step S1106 for acquiring the MIB data, as shown in FIG. 8, managed by the MIB management unit 1003 of the selected apparatus (composite apparatus 1000 shown in FIG. 1 in this case).

Then a step S1107 displays, based on the acquired MIB data, the message information currently set in the composite apparatus 1000, as shown in FIG. 9.

Then the message data input process is started in a step S1108 for example with the keyboard of the PC/WS 11, and, in a step S1109, the message is entered and the OK key 54 is depressed as explained in the foregoing. Then, in a step S1110, the information set in the application 1103 is stored as the MIB data in the MIB management unit 1104 of the hard disk of the PC/WS 11. At the same time, a step S1111 encodes and transmits the MIB data, including the message characters set in the SNMP client module.

When a step S1112 discriminates that the process is completed, the process of the application 1103 is terminated and the message processing utility is closed.

Figure 12:
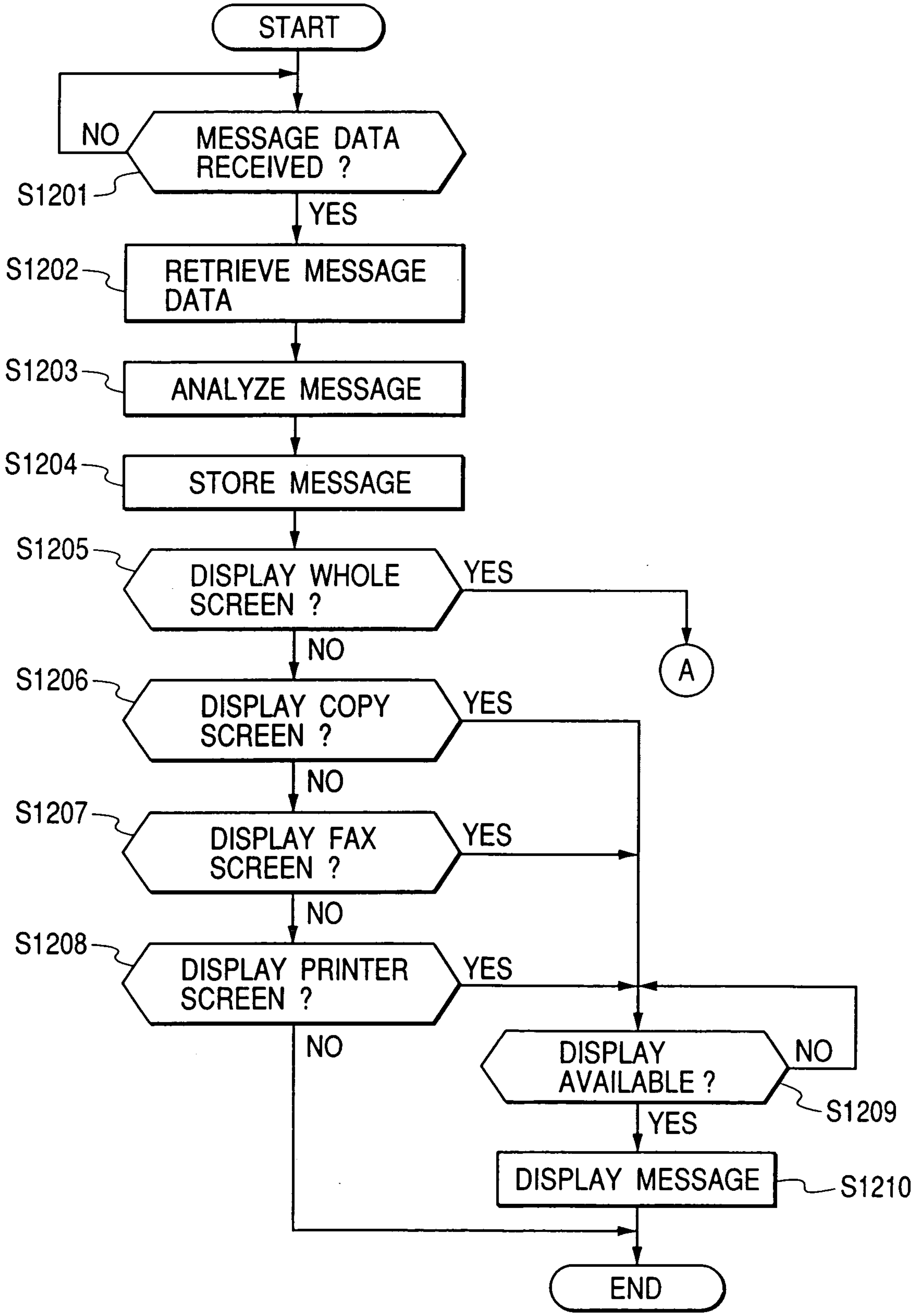
FIGS. 12 and 13 are flow charts showing the process sequence in the composite apparatus shown in FIG. 1.
Figure 13:
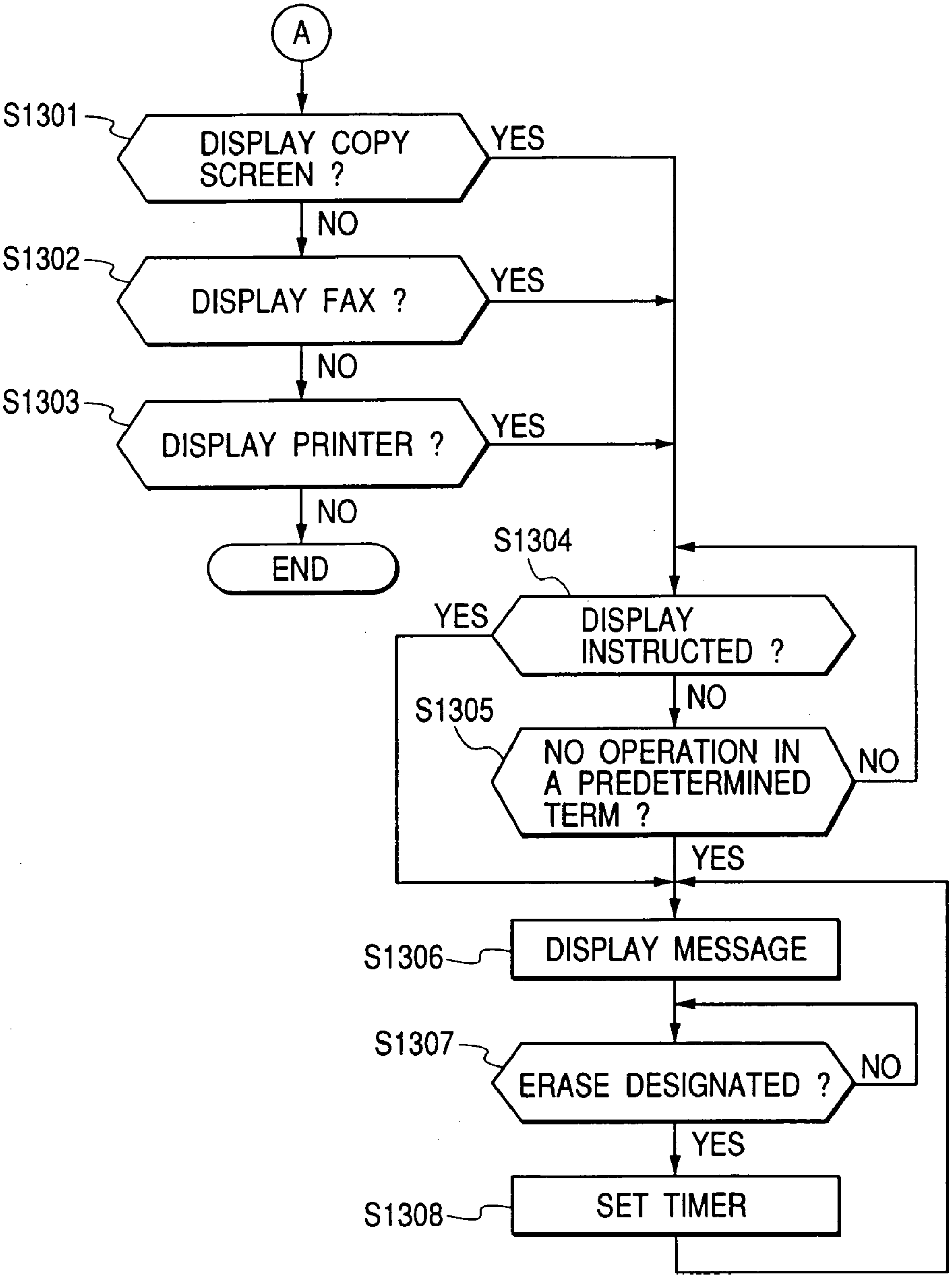

FIGS. 12 and 13 are flow charts showing the process sequence of the composite apparatus 1000.

These flow charts indicate the flow of the controlling operations of the CPU 123 based on the program data stored in the memory 124 and in cooperation with various units (computer interface unit 7, panel control unit 1002 etc.).

In FIG. 12, a step S1201 awaits the reception of message data, to be displayed on the operation unit 115, through the computer interface unit 7, and, upon reception, a step S1202 reads the received message data.

A step S1203 causes the SNMP agent module 1001 to decode and analyze the message data received as the SNMP packet. Then a step S1204 stores the message data in the MIB management unit 1003 in the memory 124.

Then, based on the result of analysis in the step S1203, a step S1205 discriminates whether the message data are for display for the entire image area, namely for display of the pop-up message, and, if not, steps S1206 to S1208 execute discrimination on the display of status message, namely whether the message data are to be displayed in a part of the copy image frame, facsimile image frame or printer image frame.

In the following there will be explained message data to be displayed in a part of the copy image frame, but the process is naturally similar in case of the message data to be displayed in a part of the facsimile image frame or printer image frame.

In case of the message data to be displayed in a part of the copy image frame, a step S1209 discriminates that the touch panel TP of the operation unit 115 currently displays the copy image frame and that a message can be displayed on such copy image frame. If the copy image frame is currently displayed or if the copy image frame is currently displayed but the message cannot be displayed because of display of other data, the sequence waits until the display is enabled on the copy image frame.

On the other hand, if the message display is possible on the copy image frame, the status message received from the PC/WS 11 (namely characters entered in the input area 57) is displayed as the status message in the predetermined display area on the displayed image frame of the touch panel TP of the operation unit 115 (step S1210). The message continues to be displayed until the erasing command is received from the PC/WS 11 or a message of higher priority is displayed. The message is stored in the hard disk 13 as explained in the foregoing even when the power supply is cut off, and is displayed again when the power supply is turned on next time.

Figure 14:
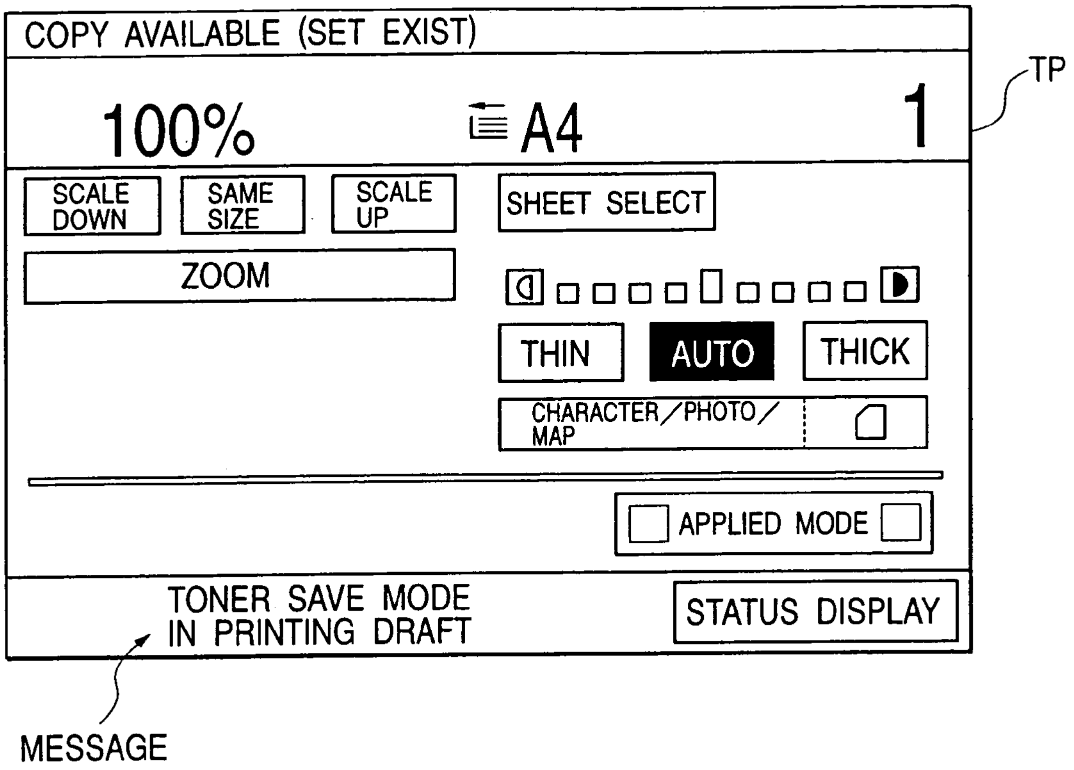
FIG. 14 is a view showing an example of the display on a liquid crystal touch panel of the operation unit 115 in case the status message is displayed.

As shown in FIG. 14, the status message is displayed in a position not hindering the ordinary operations.

In case the aforementioned step S1209 identifies that the message data are for the display on the entire image frame, steps S1301 to S1303 discriminate whether the message data are for display on the entire copy image frame, the entire facsimile image frame or the entire printer image frame.

In the following there will be explained message data to be displayed on the entire copy image frame, but the process is naturally similar in case of the message data to be displayed on the entire facsimile image frame or printer image frame.

Figure 15:
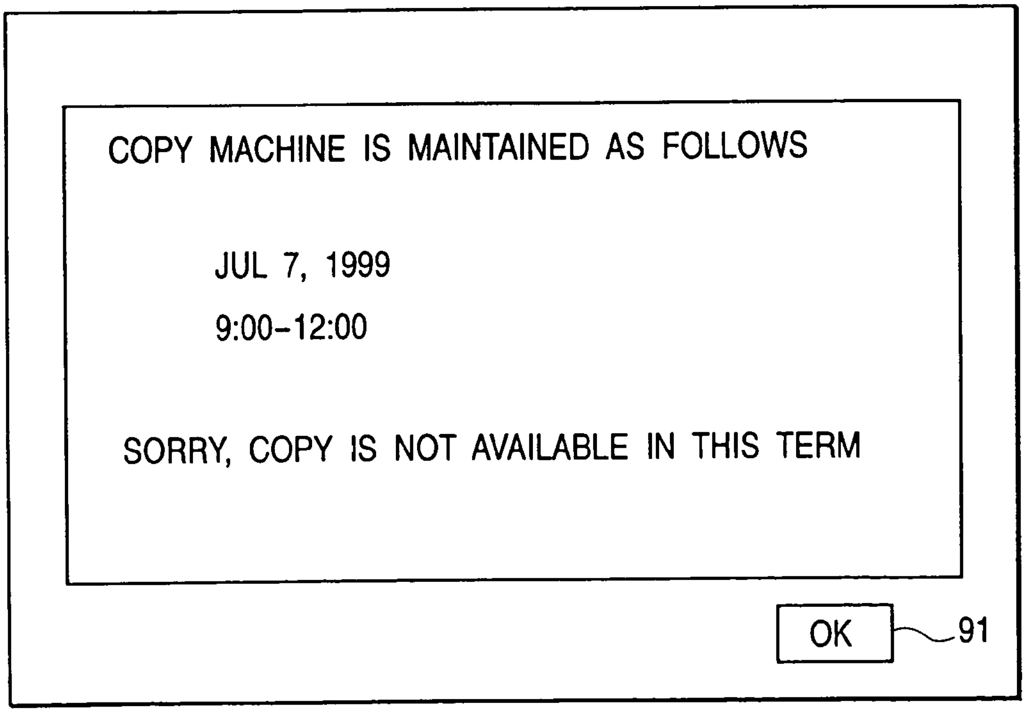
FIG. 15 is a view showing an example of the display on a liquid crystal touch panel of the operation unit 115 in case the pop-up message is displayed.

In case of a message to be displayed on the entire copy image frame, a step S1304 discriminates whether the instruction from the operation unit 115 is to display the pop-up message. If instruction for display is given, a step S1306 displays a message on the copy image frame as shown in FIG. 15, based on the message data corresponding to the input area 60 and the message type. On the other hand, if the instruction for display is not given, a step S1305 discriminates whether any operation has been made on the operation unit 115 within a predetermined time, and, in case of no operation, the sequence proceeds to the step S1306 to display the pop-up message. The pop-up message display of the step S1306 is continued until the erasure is designated (by depressing the OK key 91) by the user on the display image frame (as discriminated in step S1307) shown in FIG. 15.

In case the erasure is designated, a step S1308 sets a time, designated as the display interval, in a timer. Then the sequence returns to the step S1304 whereby the message shown in FIG. 15 is displayed again after the lapse of the designated time. However such re-display is not executed when the display on the touch panel TP is turned off but is made in case of any operation thereof. In this manner it is rendered possible to cause plural users to confirm the message, while economizing the electric power consumption.

The above-described flow is repeated until the erasure of message is designated from the PC/WS 11. The message is stored in the hard disk 13 even when the power supply is turned off and is displayed again when the power supply is turned on next time, thereby being informed to other users.

In the first embodiment, as explained in the foregoing, to the composite apparatus having plural functions such as copier, facsimile and printer, message data such as failure or maintenance notice corresponding to these functions are transmitted from the computer, and the message corresponding to a function is displayed at a desired timing while such function is designated. Consequently the managing person is not required to paste a notice sheet for the failure or maintenance notice on the main body of the composite apparatus, and is therefore relieved from such burden.

It is also possible to draw attention of the user to cost reduction by a message, and the burden of the managing person for cost reduction can therefore be reduced. In addition, drawing attention to the cost reduction by a displayed message is more effective than that by an oral message or a pasted poster by the managing person, so that the cost reduction can be securely attained.

It is also possible to transmit and display message data such as on the failure or maintenance notice for each function to the plural compatible apparatus connected by a network, from a computer present on such network.

Also in case of display message data in a part of the display image frame, it is possible to set the display interval or to erase the displayed message by a key operation of the user as in the case of message display on the entire display image frame.

Furthermore, the message data exchange between the computer and the composite apparatus can be achieved according to the existing SNMP.

The data managed by MIB are not limited to the aforementioned configuration if they are described according to MIB, and such data are only required to be exchangeable between the SNMP manager and the SNMP agent according to SNMP as data on MIB.

Second Embodiment

In the following there will be explained a second embodiment of the present invention, in which the display message is exchanged by the electronic mail.

The second embodiment also employs the configurations of the first embodiment shown in FIGS. 1 to 4, 6 to 8, 14 and 15, and these configurations will not therefore be explained further.

Figure 16:
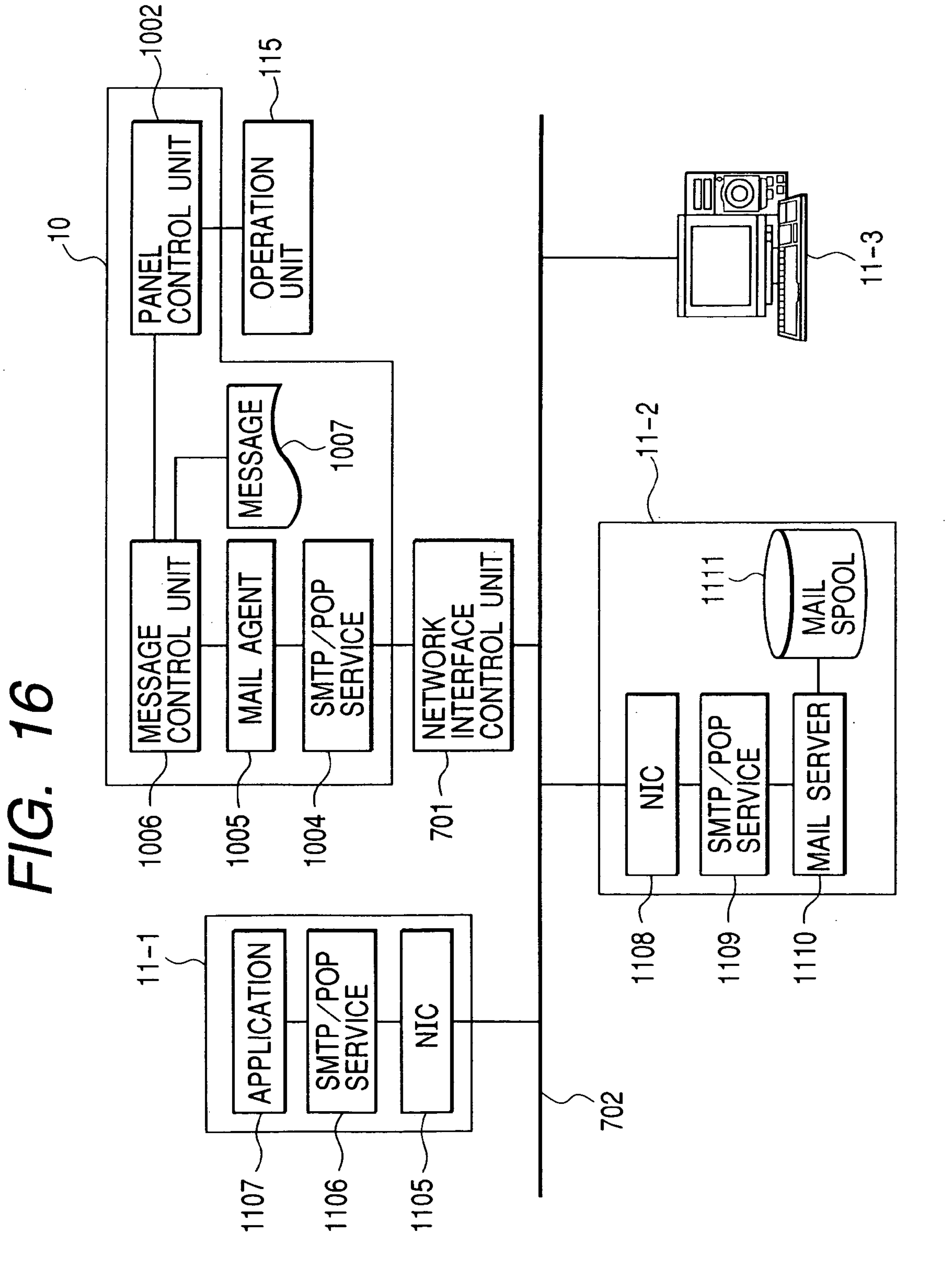
FIG. 16 is a view showing the modules executing processing operations in a second embodiment.

FIG. 16 shows the configuration of modules required for realizing the second embodiment.

A PC/WS 11-1 executes information exchange with other apparatus on the LAN 702 through the NIC 1105. A SMTP/POP service module 1106 controls the internet mail communication service according to the existing SMTP (simple mail transfer protocol) and POP (post office protocol), and a mail application 1107 executes mail operation utilizing the SMTP/POP service module.

There are also provided a PC/WS 11-2 which is a mail server computer for executing the communication service for the mails for the message data of the present embodiment; an NIC1108 for controlling information exchange with other apparatus through the LAN 702; an SMTP/POP service module 1109 for controlling the mail communication service according to SMPT and POP; a mail server application 1110 for controlling the mail transfer based on the request according to SMTP and POP from the SMTP/POP service module 1109; and a mail spool module 1111 functioning as a mail data base managed by the mail server module.

A network interface control unit 701 is contained in the computer interface unit 7.

The memory 124 of the core unit 10 stores an SMTP/POP service module 1004 for controlling the mail communication service utilizing SMTP/POP; a mail agent module 1005 for executing mail receiving process according to POP; a message control unit 1006 for analyzing the message processing mail, received by the main agent module 1005, and processing the received data for the message display; and a program information for the panel control unit 1002 for controlling the message management unit 1007 which manages the message data to be handled by the message control unit 1006 and for controlling the content of display on the operation unit 115.

A mail server 11-3 handling the ordinary electronic mails is also connected to the LAN 702. However the PC/WS 11-2 may also be used in common as this mail server 11-3 by installing the mail server application for processing ordinary electronic mails in the PC/WS 11-2.

Figure 17:
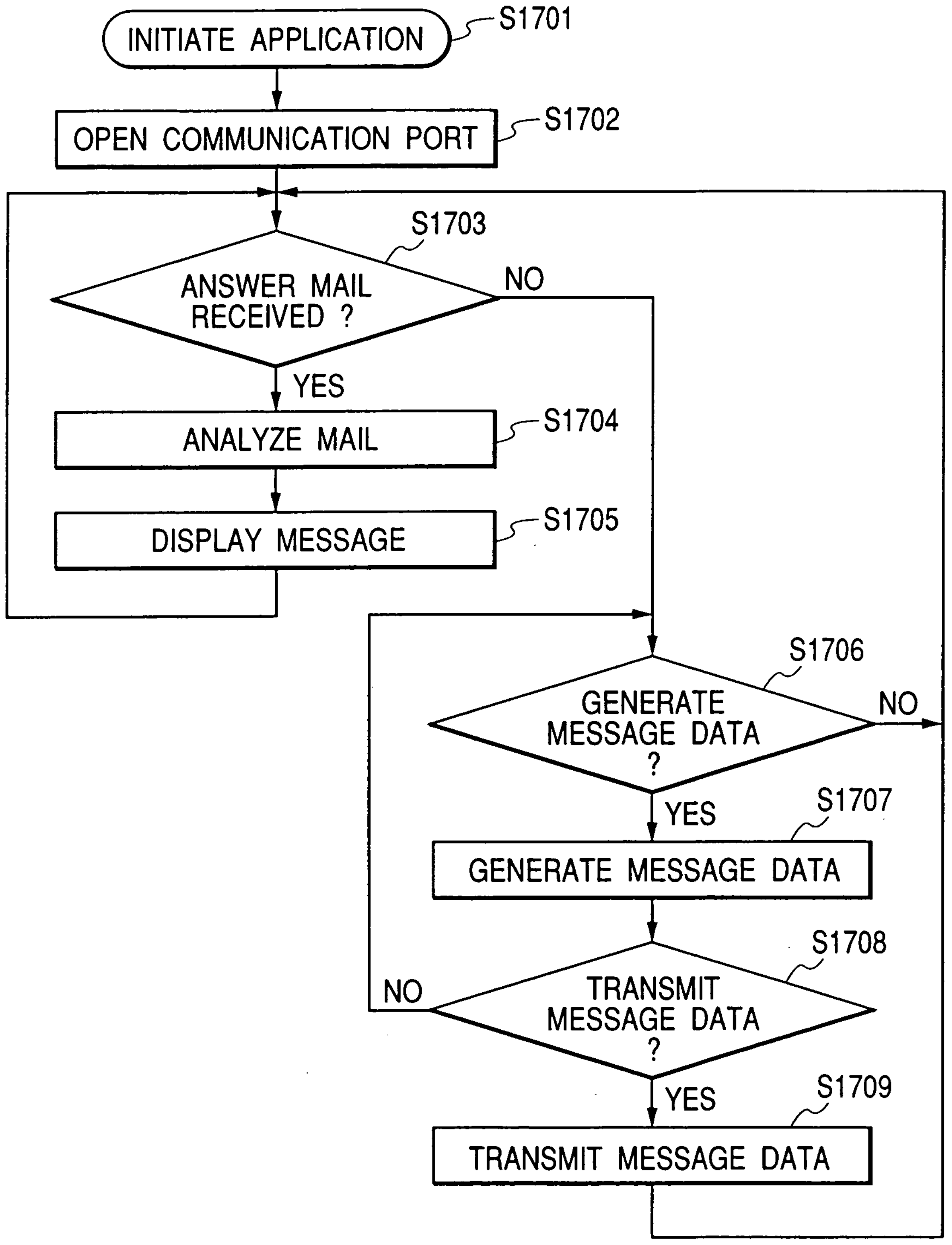
FIG. 17 is a flow chart showing the process sequence of a PC/WS 11-1 in the second embodiment.

FIG. 17 is a flow chart showing the process sequence executed by the PC/WS 11-1. This flow chart is executed by the application 1107 in cooperation with the OS, SMTP/POP service module 1106, NIC 1105 etc. installed in the PC/WS 11-1, and indicates the control sequence of the CPU of the PC/WS 11-1 based on the program data installed in the hard disk of the PC/WS 11-1.

At first a step S1701 activates the application 1107 for message processing by electronic mail, and a step S1702 opens a communication port of the PC/WS 11-1.

Then a step S1703 discriminates whether a response mail to be explained later from the composite apparatus has been received, and, if not received, a step S1706 discriminates whether there has been an instruction for starting the preparation of message data.

The preparation of message data has been instructed, a step S1707 displays a predetermined UI (user interface) and executes preparation of the message data. The message data prepared in this operation have the format of an electronic mail, which is composed of, as shown in FIG. 20, the subject as "Set", and the main text including TYPE for designating the display mode for the pop-up message as in the foregoing first embodiment;

LINE 1 to 4 of messages of 4 rows for the pop-up message; PANEL for designating the message for the copy, facsimile or printer image frame; and STATUS for designating the message for the status message.

After the input by the user of such mail, when a step S1708 instructs transmission, a step S1709 causes the SMTP/POP service module 1106 to execute transmission by SMTP to the PC/WS 11-2 through the NIC 1105.

In case the step S1707 designates "Get" as the subject and the step S1709 transmits the electronic mail, there is requested the message data currently set in the composite apparatus, and a step S1704 waits for the response mail from the composite apparatus. The response mail has a format as shown in FIG. 21. Then the step S1704 analyzes the content of the response mail and a step S1705 executes display for example shown in FIG. 9 on the PC/WS 11-1.

Figure 18:
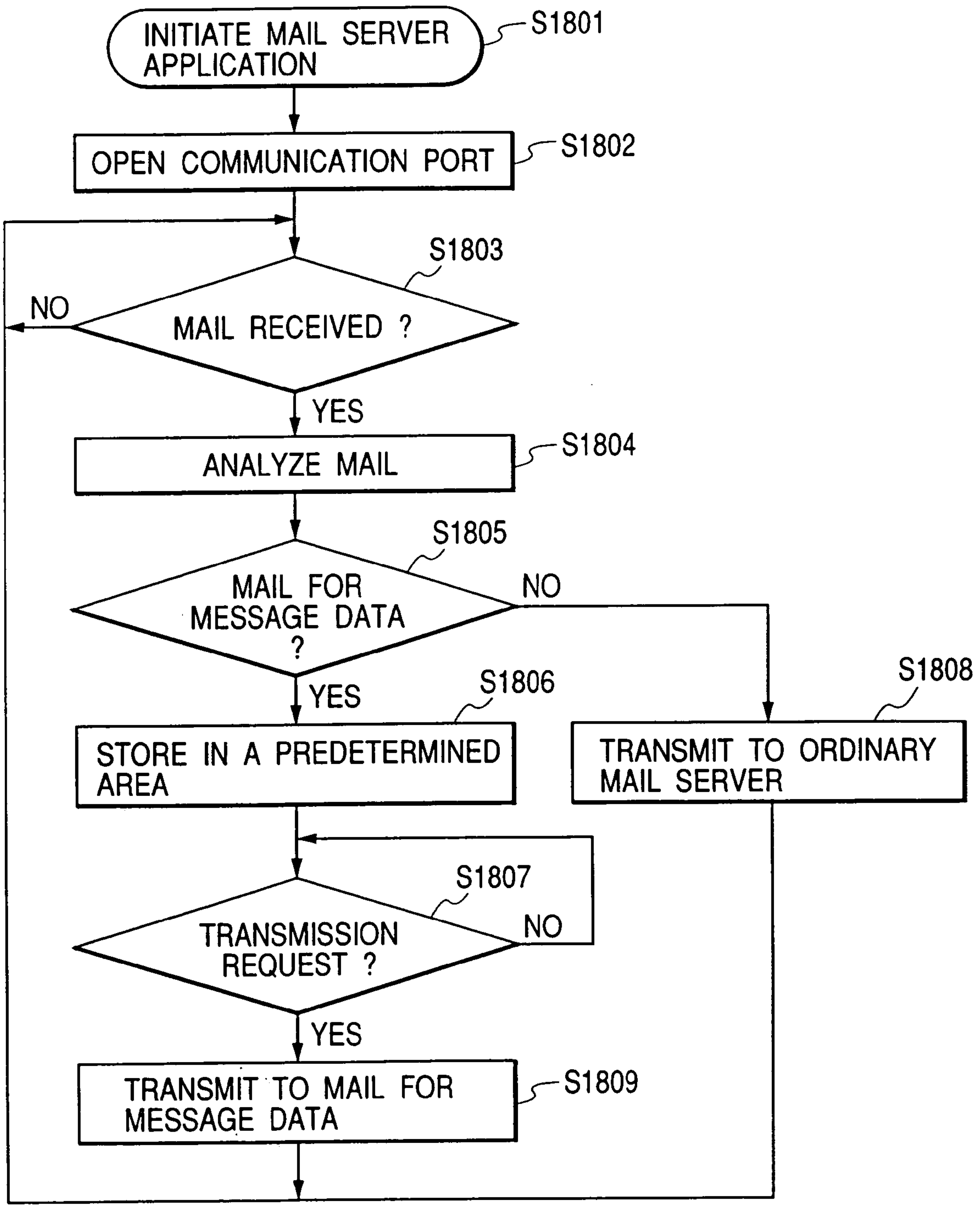
FIG. 18 is a flow chart showing the process sequence of a PC/WS 11-2 in the second embodiment.

FIG. 18 is a flow chart showing the process sequence executed by the PC/WS 11-2. This flow chart is executed by the mail server application 1110 in cooperation with the OS, SMTP/POP service module 1109, NIC 1108 etc. installed in the PC/WS 11-2, and indicates the control sequence of the CPU of the PC/WS 11-2.

At first a step S1801 activates the mail server application, and a step S1802 opens a communication port of the PC/WS 11-2.

Then a step S1803 waits for the reception of an electronic mail, and, upon reception, a step S1804 analyzes the content of the mail. This mail is received by SMTP and the destination is checked.

If the analysis indicates (as discriminated in step S1805) a mail for message data addressed to the composite apparatus where the message is to be displayed, a step S1806 stores the mail in a message data area on the hard disk of the PC/WS 11-2 managed by the mail spool module 1111. Any other ordinary electronic mail is transferred in a step S1808 to the mail server 11-3.

If transfer of the mail for message data is requested from the composite apparatus where the message is to be displayed in a step S1807, the mail for message data managed by the mail spool module 1111 is transferred at step S1809. The transfer in this operation is accepted by POP from the composite apparatus.

Figure 19:
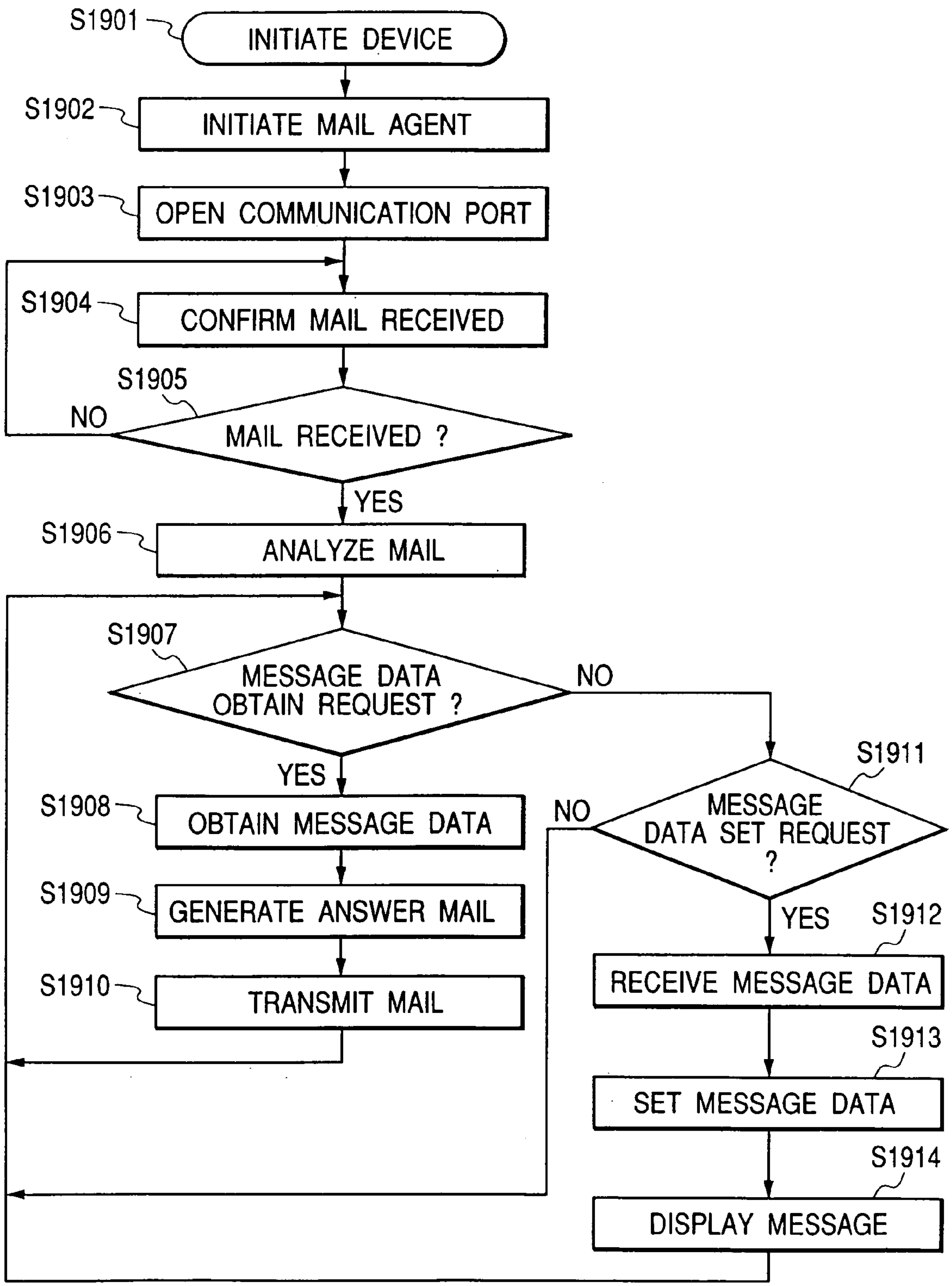
FIG. 19 is a flow chart showing the process sequence of the composite apparatus of the second embodiment.

FIG. 19 is a flow chart showing the process sequence executed by the composite apparatus where the message is to be displayed. This flow chart shows the control sequence executed by the CPU 123 in cooperation with various units (computer interface unit 7, panel control unit 1002 etc.) based on the program data stored in the memory 124.

At first a step S1901 activates the composite apparatus, then a step S1902 activates the mail agent module 1005 and a step S1903 opens a communication port.

A step S1904 checks the reception of the electronic mail, and, if a step S1905 discriminates the reception of the electronic mail, a step S1906 analyzes the content of the received mail. The mail reception check in the step S1905 is executed periodically.

As a result of mail analysis, if a step S1907 identifies that the subject of the received mail is "Get", indicating a request for acquiring the current message data, a step S1908 acquires the currently set message data from the panel control unit 1002, and a step S1909 prepares a response mail as shown in FIG. 21. Then a step S1910 transmits the mail by SMTP through the network interface 701 to the transmission source of the requesting mail.

Also if a step S1911 identifies that the subject of the received mail is "Set", indicating a request for setting the message data as shown in FIG. 20, a step S1912 analyzes the content of the mail, and a step S1913 executes setting of the message data by the message control unit, retaining the message data by the message management unit 1007 and requesting display to the panel control unit 1002. Then a step S1914 displays the message on the touch panel TP of the operation unit 115 as shown in FIGS. 14 and 15.

As explained in the foregoing, the second embodiment allows to exchange message to be displayed on the operation unit, utilizing the existing protocol of the electronic mail. Based on such description, the PC/WS 11-1 can employ the general-purpose electronic mail application, thereby easily transmitting, correcting or confirming the message to be displayed on the composite apparatus. Also a similar process can be executed by an apparatus compatible with the composite apparatus of the present embodiment.

In the present embodiment, the requested item (acquisition or setting of message) of the mail is judged by the mail subject while the content of the mail is identified by the TYPE and LINE rows of the main text, but there may also be employed other format that can be handled by the message control unit.

Also for receiving the mail by the mail agent module from the mail server application, the received is periodically confirmed by POP, it is also possible to deliver the mail addressed to the composite apparatus where the message is to be displayed, by SMTP to the composite apparatus without spooling in the mail spool module. In such case, the delivery method is set in the mail server when the composite apparatus is connected to the LAN.

Third Embodiment

In the following there will be explained a third embodiment, in which the display color of the message on the operation unit 115 is varied according to the priority.

Figures 22, 23:
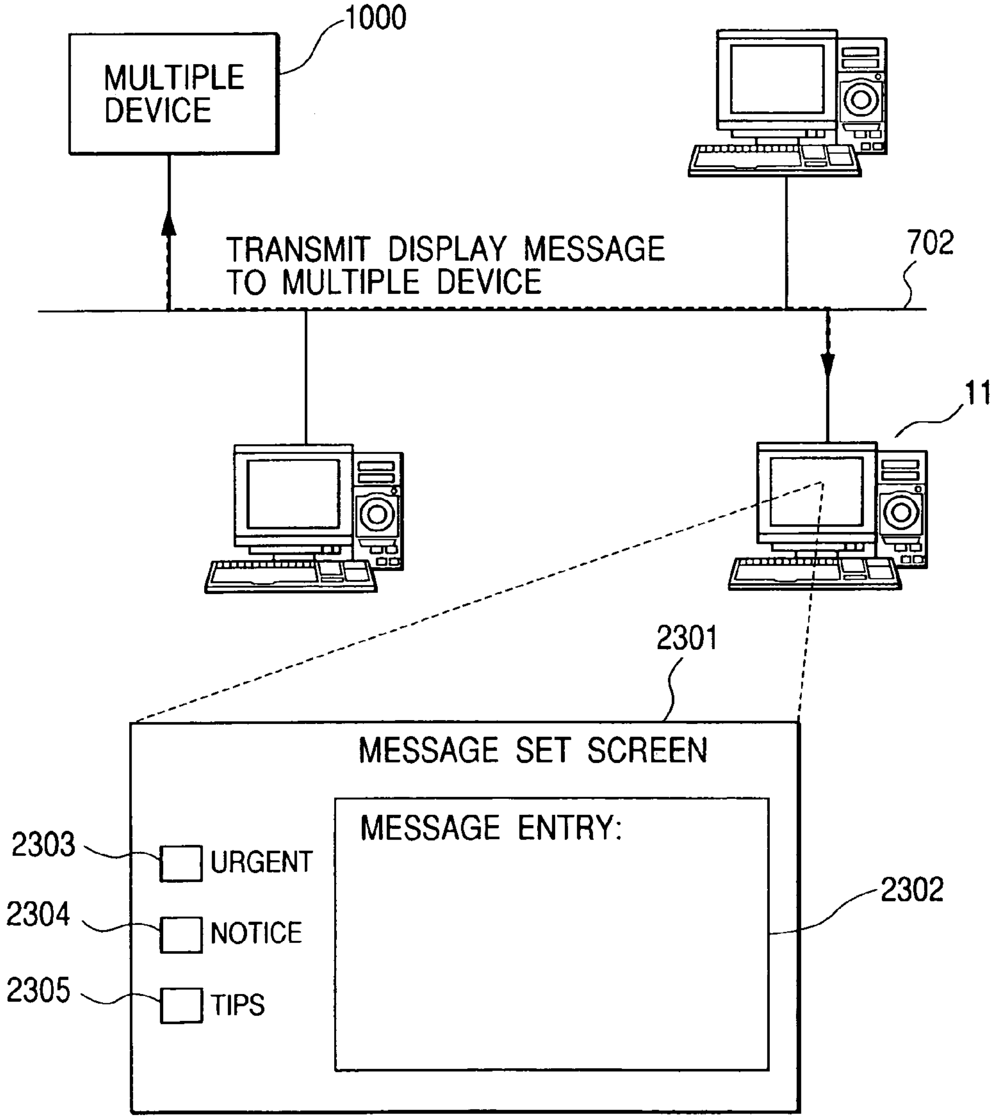
FIG. 22 is a table showing the correspondence between the priority of message and the display color.
FIG. 23 is a view showing the data flow between the composite apparatus in a third embodiment and the PC/WS 11 connected through the network.

In this embodiment, the memory 124 of the core unit stores a table for designating the color of the message displayed on the touch panel TP of the operation unit 115, in correspondence with the priority, as shown in FIG. 22.

FIG. 23 schematically shows the flow of the message data and the setting image frame and displayed message on the PC/WS 11.

As shown in FIG. 23, in an exemplary message set screen 2301, in setting the message data in the PC/WS 11 via message entry 2302, the user is requested to check either of check boxes 2303, 2304 and 2305, "URGENT", "NOTICE" and "TIPS", respectively. Then a code indicating URGENT=PRIORITY 1, NOTICE=PRIORITY 2 or TIPS=PRIORITY 3 is transferred, together with the message data, to the composite apparatus 1000 in which the message is to be displayed.

Figure 24:
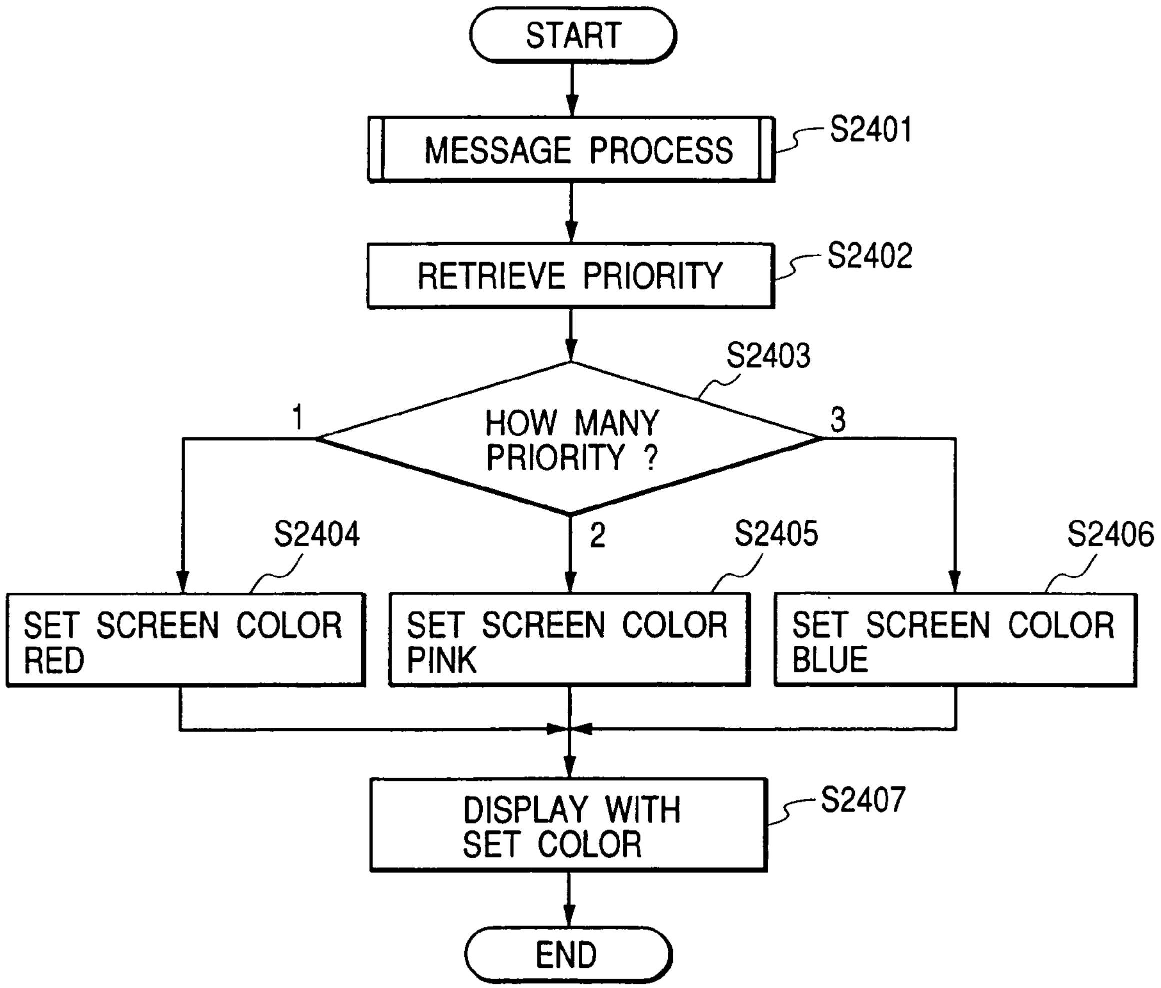
FIG. 24 is a flow chart showing the process sequence in the composite apparatus of a fourth embodiment.

FIG. 24 is a flow chart showing the process sequence in the composite apparatus 1000 and indicating the control sequence executed by the CPU 123 based on the program data stored in the memory 124.

At first a step S2401 executes a message processing of receiving a message and setting the message in the operation unit 115. This process can be same as in the first or second embodiment and will not be explained further in detail.

Then a step S2402 reads the priority contained in the received message data, and a step S2403 discriminates the priority.

In case of priority 1, a step S2404 sets red for the display color; in case of priority 2, a step S2405 sets pink for the display color; and in case of priority 3, a step S2406 sets blue for the display color.

Based on thus set display color, a step S2407 displays the message data processed in the step S2401 on the touch panel TP of the operation unit 115 under the aforementioned condition.

The priority, display color and setting method therefor are not limited to those explained above.

It is also possible to manage the table, showing the correspondence between the priority and the display color, in the PC/WS 11 and to designate the display color at the transmission of the message data.

In the third embodiment, as explained in the foregoing, the display color of the message displayed on the operation unit is varied according to the priority, whereby the priority of the message can be more directly transmitted to the user.

Fourth Embodiment

In the following there will be explained a fourth embodiment, in which the display of the file, managed by the image memory unit 9, is controlled, utilizing display function in various display colors as in the third embodiment.

An image memory unit 9 can store plural files such as a file received through the computer interface unit 7, and, in the present embodiment, the display color is varied according to the attribute of the file.

Figures 25, 27:
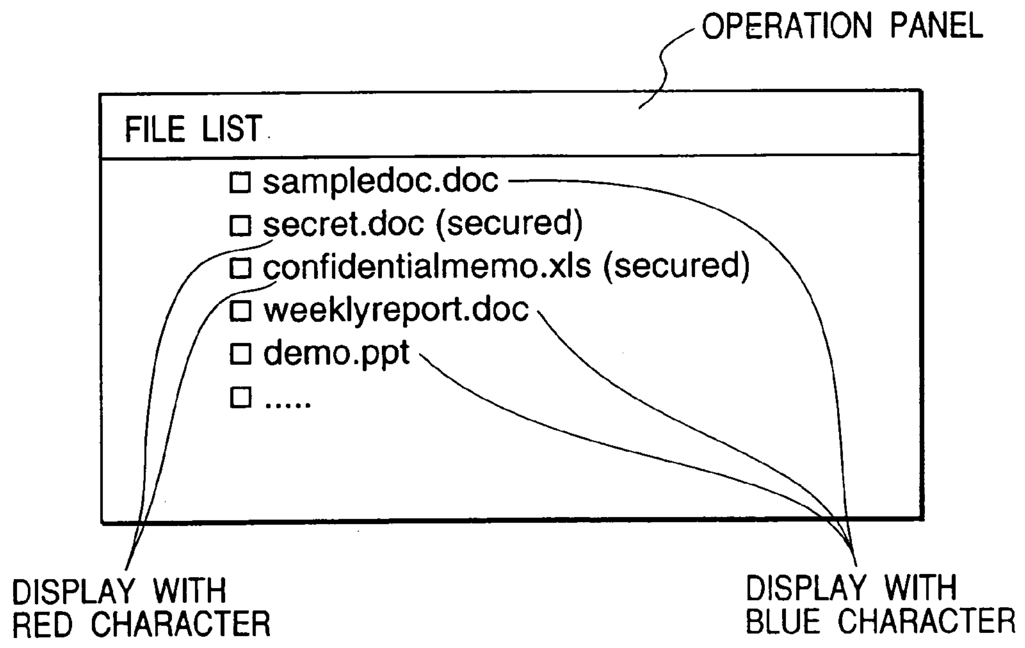
FIG. 25 is a table showing the correspondence between the file attribute stored in an image memory unit 9 and the display color of the file name.
FIG. 27 is a view showing an example of the file name display on the liquid crystal touch panel TP of the operation unit 115 in the fourth embodiment.

In the present embodiment, the memory 124 of the core unit stores a table as shown in FIG. 25 for designating the display color, according to whether the file stored in the image memory unit 9 is protected by a password.

Figure 26:
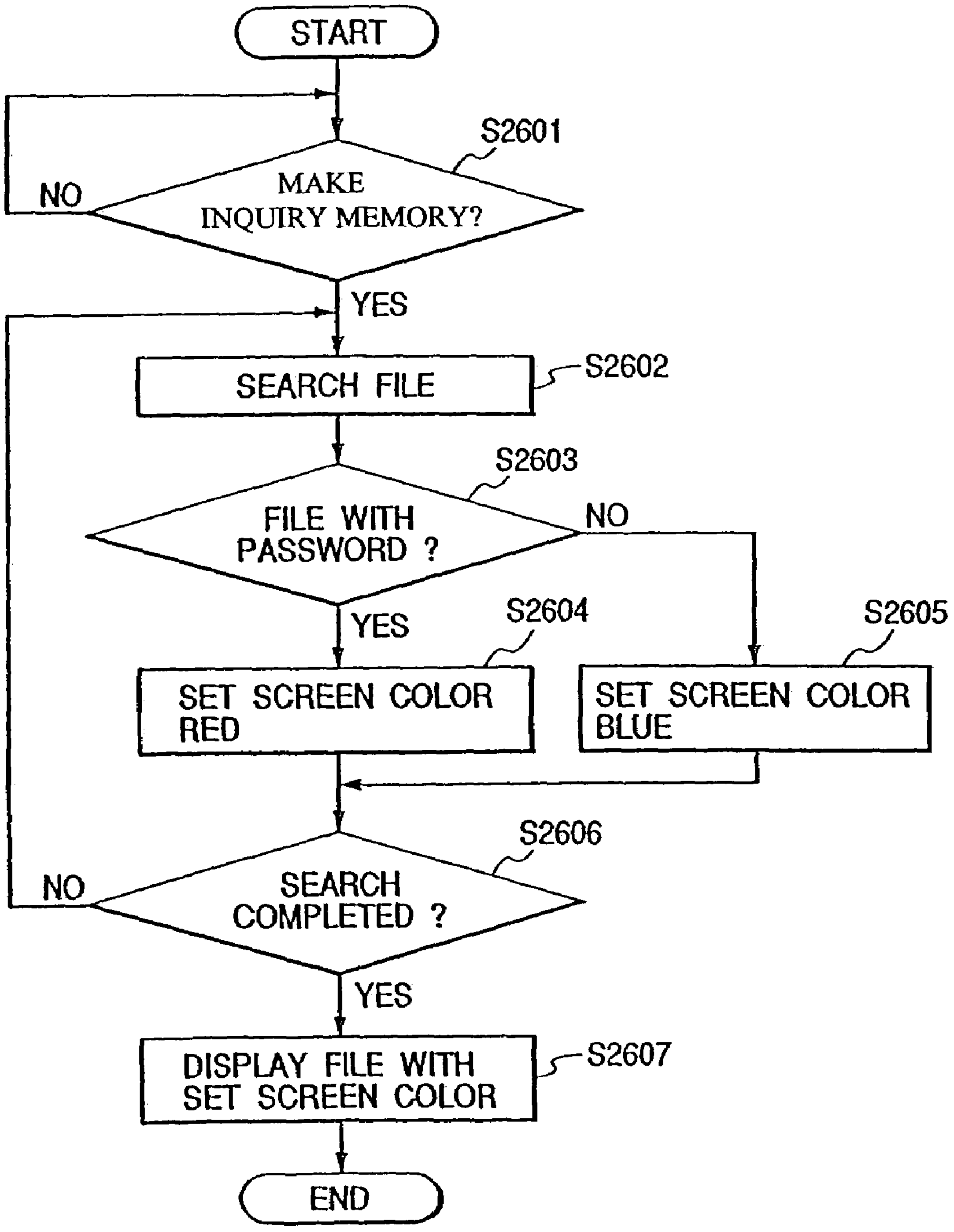
FIG. 26 is a flow chart showing the process sequence in the composite apparatus of the fourth embodiment.

FIG. 26 is a flow chart showing the process sequence in the present embodiment and indicating the control sequence executed by the CPU 123 based on the program data stored in the memory 124.

At first a step S2601 discriminates whether the operation unit 115 has designated reference to memory, for displaying, on the touch panel TP, the file names of the files stored in the image memory unit 9.

If reference to memory is designated, a step S2602 executes search in the image memory unit 9 and a step S2603 checks the attribute of each file, namely whether each file is protected by a password. Then a step S2604 sets red as the display color for the file which is judged as protected by the password, and a step S2605 sets blue as the display color for the file which is judged as not protected by the password. The file search is continued until a step S2606 judges that all the files have been searched, and then a step S2607 displays a list of the files with the respective display colors on the touch panel TP as shown in FIG. 27.

The file protected with the password can be outputted by entering the password from the ten keys TK.

The file can be outputted by printing in the printer unit 2 or by display on the touch panel TP. The display form for the file attribute and file information can be suitably modified or added.

As explained in the foregoing, the fourth embodiment allows the user to directly identify the attribute of the stored file.

Fifth Embodiment

In the following there will be explained a fifth embodiment, in which the operation unit and the printer unit are linked to control the operation of the printer unit according to the message data transmitted from the PC/WS 11.

Figure 28:
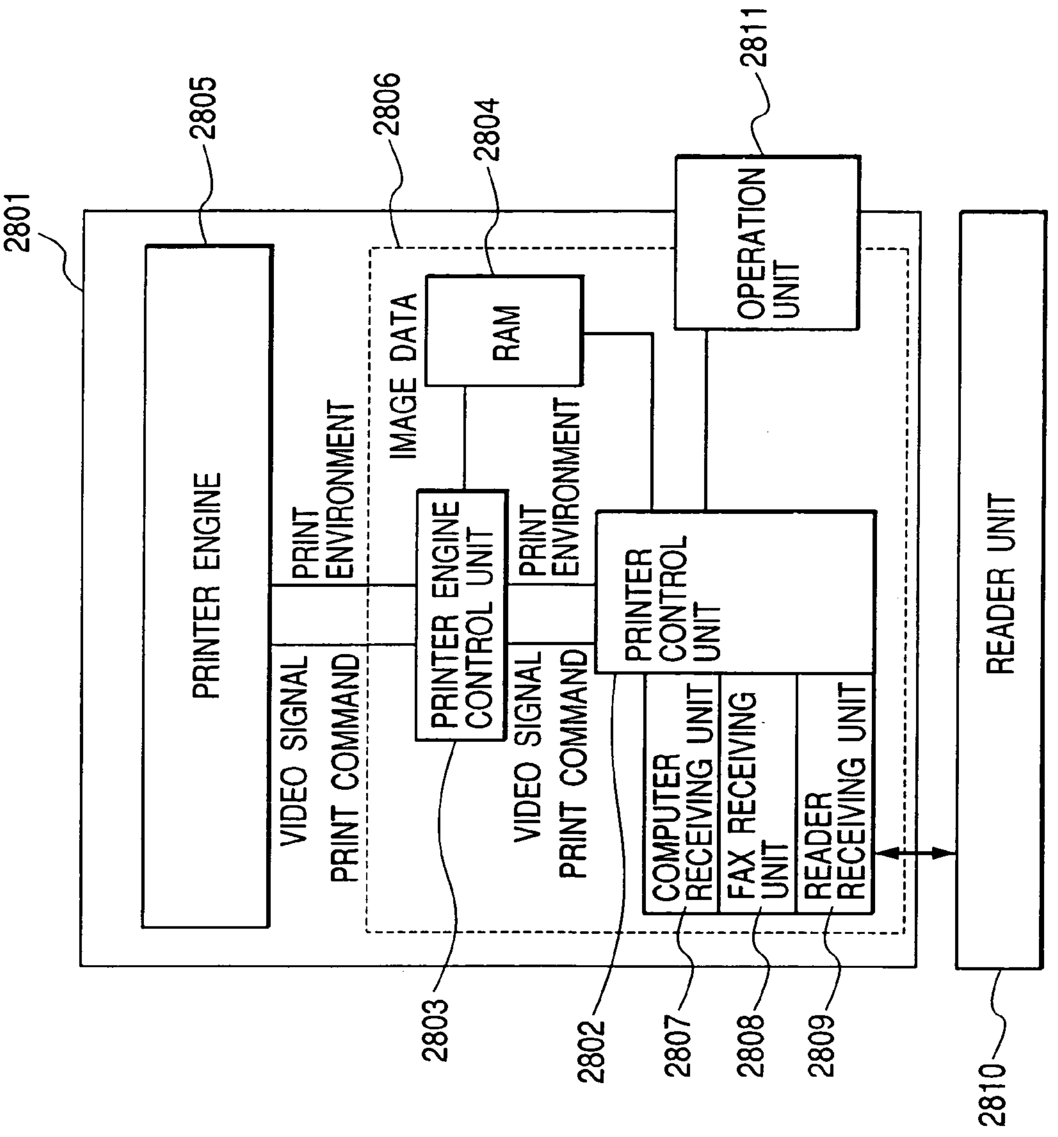
FIG. 28 is a schematic block diagram showing the configuration of the composite apparatus of a fifth embodiment.

FIG. 28 is a block diagram showing the configuration of the composite apparatus in the fifth embodiment.

A printer unit 2801 executes the printing operation similar to that of the aforementioned printer unit 2. A printer control unit 2802 analyzes the entered data to be printed, transfers the print command of such data (video signal) and the printing environment to the printer engine, also transfers the message data, received from the PC/WS 11, to an operation unit 2811 and controls the printer unit 2801 according to the information contained in the message data. The printer control unit 2802 is provided with a CPU, a ROM and a RAM. A printer engine control unit 2803 transfers the video signal, print command and printing environment thereby controlling the printer engine 2805 for obtaining a print by electrophotographic method.

A RAM 2804 serves to store the data to be printed.

The printer engine 2805, consisting of an electrophotographic printer unit provided with a recording sheet conveying mechanism, a semiconductor laser unit, a photosensitive drum, a developing unit, a fixing unit, a drum cleaning unit, a separating unit etc. and executes printing by the electrophotographic process.

A computer reception unit 2807 receives, from the PC/WS 11, information including the data to be printed and the message to be displayed on the operation unit 2811, while a FAX reception unit 2808 receives the facsimile data from an ordinary telephone line or an exclusive line, and a reader reception unit 2809 receives data from a reader unit 2810 similar to the reader unit 1.

The printer control unit 2802, printer engine control unit 2803, RAM 2804, computer reception unit 2807, FAX reception unit 2808, reader reception unit 2809 and operation 2811 are mutually linked to constitute a control unit 2806 for executing the operation shown in FIG. 28.

The operation unit 2811 is similar in configuration to the aforementioned control unit 115.

Figure 29:
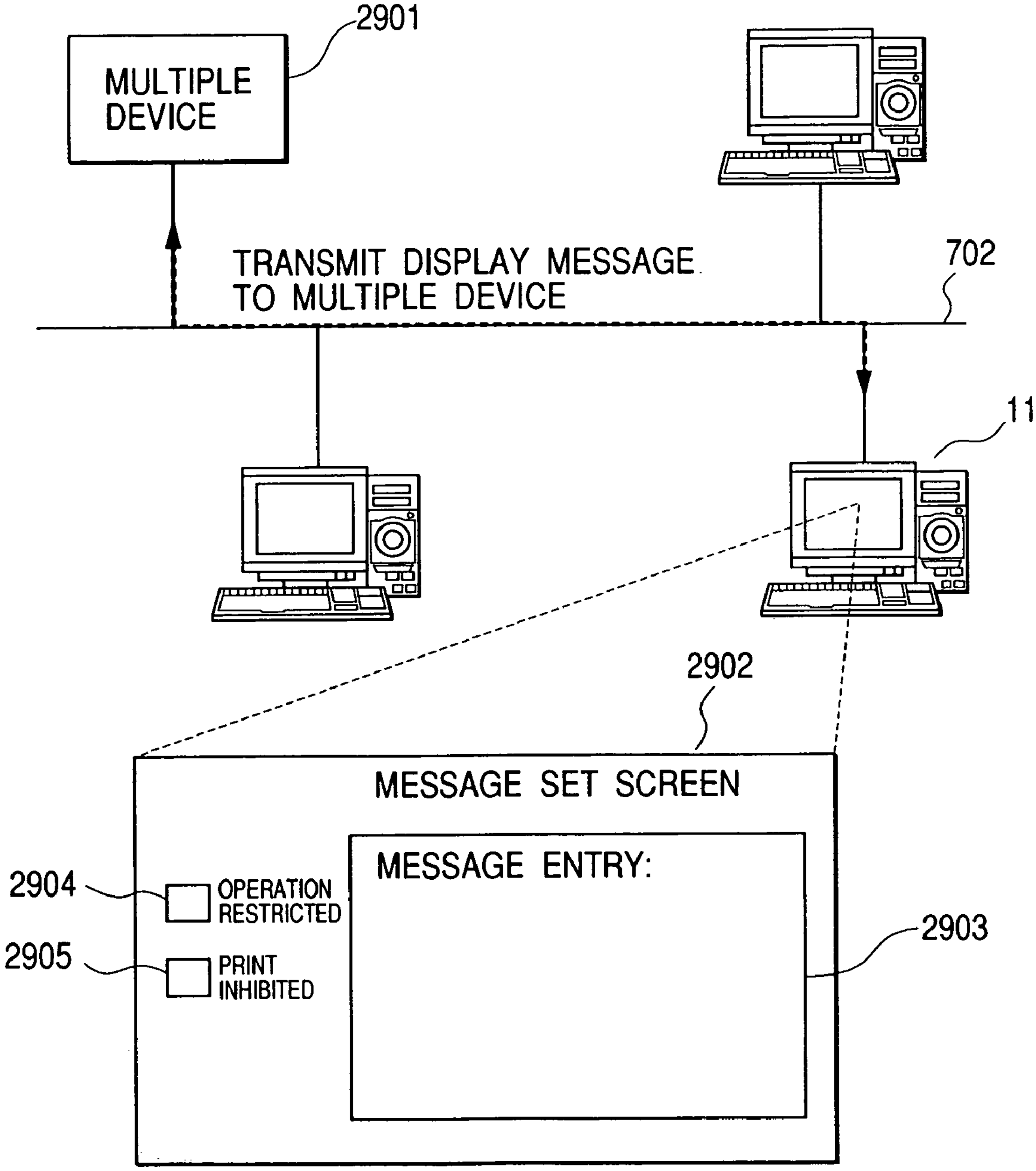
FIG. 29 is a view showing the data flow between the composite apparatus of the fifth embodiment and the PC/WS 11 connected through the network.

FIG. 29 schematically shows the process and data flow in the fifth embodiment.

A message is entered via screen 2902 and field 2903 as in the foregoing embodiments by the utility of the PC/WS 11 connected to the LAN 702, and a check box 2904 or 2905 is at the same time selected in order to designate limitation of operation or inhibition of printing.

These information are then transmitted to a composite apparatus 2901 shown in FIG. 28.

Figure 30:
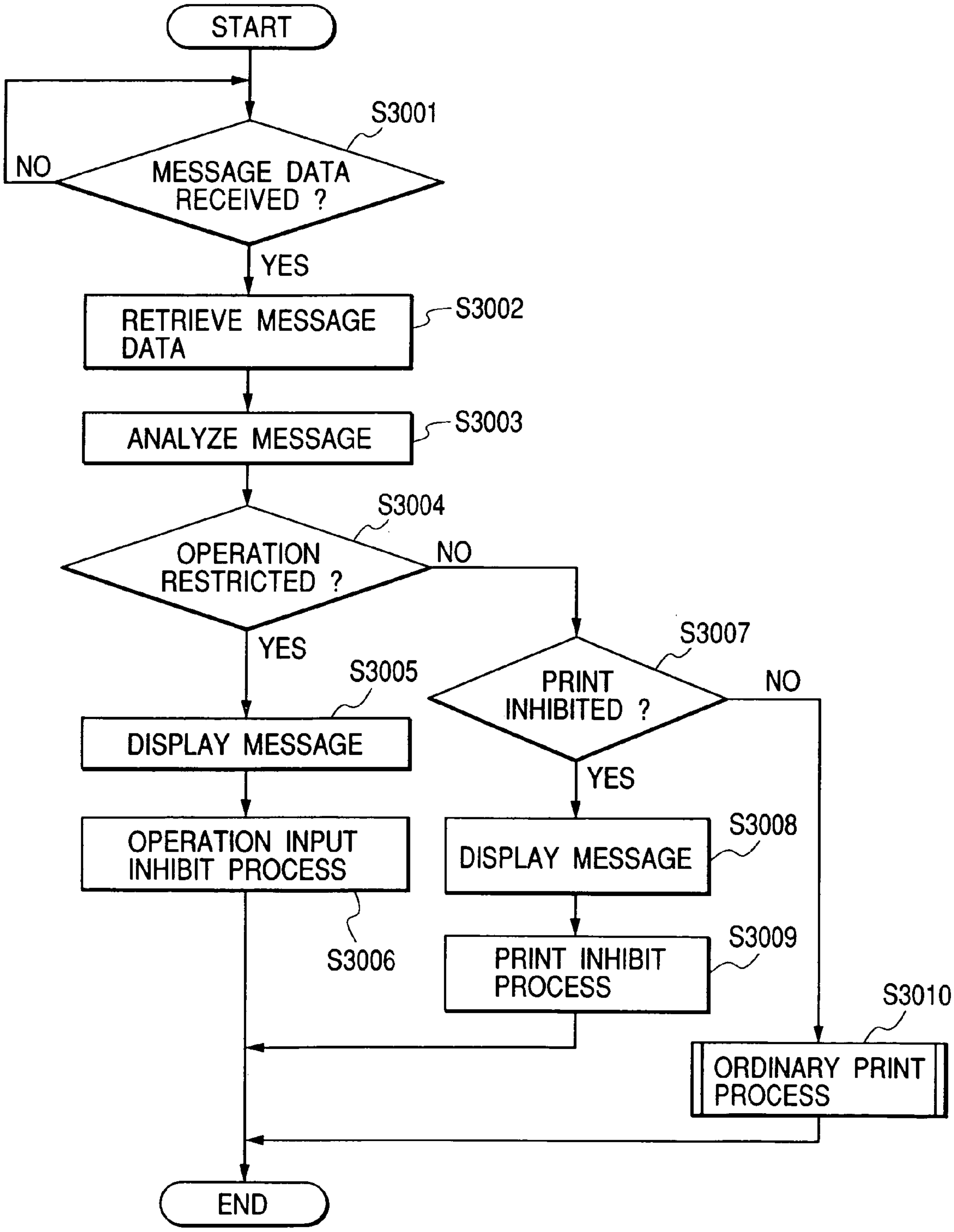
FIG. 30 is a flow chart showing the process sequence in the fifth embodiment.

FIG. 30 is a flow chart showing the process sequence in the composite apparatus 2901, and indicating the control sequence executed by the CPU of the printer control unit 2802 based on a program stored in the ROM of the printer control unit 2802.

At first a step S3001 discriminates whether the computer reception unit 2807 has received the message data, and, in case of reception, a step S3002 reads the received message data. Then a step S3003 analyzes the content of the message data, and, if a step S3004 discriminates that the message data contain information indicating the limitation on the operation, a step S3005 displays such content on the touch panel TP of the operation unit 2811 and step S3006 executes such control as to inhibit input on the operation unit 2811.

If the received message data are discriminated, at step S3007, to contain information inhibiting the printing, a step S3008 displays such information on the touch panel TP of the operation unit 2811 and a step S3009 causes the printer engine control unit 2803 to inhibit the operation of the printer engine 2805.

On the other hand, the message data do not contain information indicating limitation of operation or inhibition of printing, the sequence proceeds to a step S3010 to display other messages as in the foregoing embodiments.

As explained in the foregoing, the fifth embodiment allows to link the message displayed on the operation unit, the content of limitation of operation on the operation unit, and the printing operation by the printer unit.

The foregoing embodiments allow, in the composite apparatus with plural functions such as copying function, facsimile function and printer function, to display a desired message on the image frame for respective function, utilizing an external computer terminal.

It is therefore possible to easily, securely and promptly transmit the information on failure or notice for maintenance. Also such display can be made efficiently, utilizing the operation unit which has only been used for operating the apparatus.

Also the display on the operation unit is not limited to character data but can naturally be graphics or the like, and can be realized in various forms not only for utilizing the operation unit for notice but also for advertisement.

The processes in the foregoing embodiments are naturally subject to suitable changes or combinations.

The present invention may also be applied to a system consisting of plural equipment (for example host computer, interface devices, reader, printer etc.) or an apparatus consisting of a single equipment (such as a copying machine or a facsimile apparatus).

Also the present invention includes a case where the program codes of a software realizing the aforementioned embodiments are supplied to a computer of a system or an apparatus connected to various devices in order to operate the devices so as to realize the functions of the foregoing embodiments and the functions of the aforementioned embodiments are realized by operating the devices by the computer (CPU or MPU) of the above-mentioned system or apparatus according to the program codes.

In such case the program codes themselves of the software realize the functions of the aforementioned embodiments, and the program codes themselves and the memory medium storing the program codes constitutes the present invention.

The memory medium storing such program codes can be, for example, a floppy disk, a hard disk, an optical disk, a magnetooptical disk, a CD-ROM, a magnetic tape, a non-volatile memory card or a ROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the foregoing embodiments.

The present invention further includes a case where in the program codes read from the memory medium are once stored in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

The foregoing description of embodiment has been given for illustrative purposes only but the present invention is not limited to the foregoing embodiments and is subject to various modifications within the scope and spirit of the appended claims.

What is claimed is:

1. A data processing apparatus comprising:

an instruction input unit, arranged to input a manual instruction by an operator;

a process unit, arranged to execute a predetermined process based on the instruction input by said instruction input unit;

a connection unit, arranged to connect with an external device;

a storage unit, arranged to store message data and time information received from the external device through said connection unit;

a display unit, arranged to display a message based on the message data stored in said storage unit;

a discrimination unit, arranged to discriminate whether or not there has elapsed, without the manual instruction being input by the operator, a period of time which is designated by the time information received from the external device and stored in said storage unit; and a control unit, arranged to control said display unit to start displaying the message based on the message data stored in said storage unit, in response to the discriminated result provided by said discrimination unit that no manual instruction by the operator has been input for the period of time, wherein said storage unit is also arranged to store limitation information which was selectively transmitted from the external device and received through said connection unit, and which limits the ability to delete the message displayed on said display unit, and wherein said control unit permits deletion of the display of the message on said display unit in response to the manual instruction by the operator to said instruction input unit in a case where said storage unit does not store the limitation information, and limits deletion of the display of the message on said display unit in response to the manual instruction by the operator to said instruction input unit in a case where said storage unit stores the limitation information.

2. A data processing apparatus according to claim 1, wherein said process unit is also arranged to execute plural process functions, said display unit displays a display image frame different for each process function executed by said process unit, the message data is associated with any one of the plural process functions, and said control unit controls to display the message based on the message data to the display image frame of the associated process function.

3. A data processing apparatus according to claim 1, wherein said display unit is adapted to display a display image frame of message based on the message data received from the external device through said connection unit and stored in said storage unit, and an operation image frame for input by said instruction input unit.

4. A data processing apparatus according to claim 3, wherein the message data includes first message data to be displayed in place of the operation image frame for input by said instruction input unit and second message data to be displayed in the operation image frame, and said display unit changes over and displays the message based on the first message data and the message based on the second message data.

5. A data processing apparatus according to claim 1, wherein said control unit receives, by MIB (management information base), message data, and executes reception from the external device through said connection unit according to SNMP (simple network management protocol).

6. A data processing apparatus according to claim 1, wherein said control unit receives, as electronic mail data, message data, from the external device through said connection unit and stored in said storage unit.

7. A data processing apparatus according to claim 6, wherein said control unit receives message data, according to SMTP (simple mail transfer protocol)/POP (post office protocol).

8. A data processing apparatus according to claim 1, wherein said display unit is capable of displaying the message based on the message data of plural display colors, and said control unit is adapted to vary the display color according to the priority contained in the message data received from the external device through said connection unit and stored in said storage unit.

9. A data processing apparatus according to claim 8, wherein said storage unit comprises an accumulation unit for storing plural files, wherein said control unit is adapted to cause said display unit to display information indicating the file accumulated in said accumulation unit, with different display color according to the attribute of the file.

10. A control method for a data processing apparatus capable of executing a predetermined process based on a manual instruction by an operator and displaying various information on a display device, comprising:

a reception step of receiving message data transmitted from an external device;

a storing step of storing the message data and time information received from the external device;

a discrimination step of discriminating whether or not any manual instruction by the operator is not input for a period of time which is designated by the time information received from the external device and stored in said storing step; and a control step of controlling the display device to start displaying a message based on the message data stored in the storage unit, in response to the discriminated result provided by performance of said discrimination step that no manual instruction by the operator has been input for the period of time, wherein the storage unit can store limitation information which was selectively transmitted from the external device and received through a connection unit connected with the external device, and which indicates to limit to delete the message displayed on the display device, and wherein said control step permits deletion of the display of the message on the display device in response to the manual instruction by the operator in a case where the limitation information is not stored in the storage unit, and permits limitation on deleting the display of the message on the display device in response to the manual instruction by the operator in a case where the limitation information is stored in the storage unit.

11. A computer readable memory medium storing a program for controlling a data processing apparatus capable of executing a predetermined process based on a manual instruction by an operator and displaying various information on a display device, the program comprising:

a reception step of receiving message data transmitted from an external device;

a storing step of storing the message data and time information received from the external device;

a discrimination step of discriminating whether or not any manual instruction by the operator is not input for a period of time which is designated by the time information received from the external device and stored in said storing step; and a control step of controlling the display device to start displaying a message based on the message data stored in the storage unit, in response to the discriminated result provided by performance of said discrimination step that no manual instruction by the operator has been input for the period of time, wherein the storage unit can store limitation information which was selectively transmitted from the external device and received through a connection unit connected with the external device, and which indicates to limit to delete the message displayed on the display device, and wherein said control step permits deletion of the display of the message on the display device in response to the manual instruction by the operator in a case where the limitation information is not stored in the storage unit, and permits limitation on deleting the display of the message on the display device in response to the manual instruction by the operator in a case where the limitation information is stored in the storage unit.

* * * * *

UNITED STATES PATENT AND TRADEMARK OFFICE
CERTIFICATE OF CORRECTION

PATENT NO. : 7,167,255 B1
APPLICATION NO. : 09/451442
DATED : January 23, 2007
INVENTOR(S) : Kenji Mikami et al.

It is certified that error appears in the above-identified patent and that said Letters Patent is hereby corrected as shown below:

ON THE TITLE PAGE ITEM [56] REFERENCES CITED:

Foreign Patent Documents, "070131575" should read --07-131575--.

COLUMN 5:

Line 51, "receiving the" should be deleted.

COLUMN 6:

Line 67, "these" should read --these items of --.

COLUMN 7:

Line 1, "these" should read --these items of--; and
Line 56, "(non-display" should read --(non-display)--.

COLUMN 13:

Line 29, "message" should read --messages--; and
Line 41, "format" should read --formats--.

COLUMN 14:

Line 40, "display" should read --the display--.

COLUMN 15:

Line 64, "These" should read --These items of--.

COLUMN 16:

Line 19, "hand," should read --hand, if--; and
Line 60, "constitutes" should read --constitute--.

COLUMN 17:

Line 7, "where in" should read --wherein--;
Line 8, "once" should read --first--; and
Line 16, "embodiment" should read --embodiments--.

UNITED STATES PATENT AND TRADEMARK OFFICE

CERTIFICATE OF CORRECTION

PATENT NO. : 7,167,255 B1
APPLICATION NO. : 09/451442
DATED : January 23, 2007
INVENTOR(S) : Kenji Mikami et al.

It is certified that error appears in the above-identified patent and that said Letters Patent is hereby corrected as shown below:

<u>COLUMN 20</u>:

Line 10, "limit to delete" should read --limits deletion of--.

Signed and Sealed this

Third Day of July, 2007

JON W. DUDAS
*Director of the United States Patent and Trademark Office*